US011321919B2

(12) United States Patent
Horsman et al.

(10) Patent No.: US 11,321,919 B2
(45) Date of Patent: *May 3, 2022

(54) VOLUMETRIC DATA POST-PRODUCTION AND DISTRIBUTION SYSTEM

(71) Applicant: Arcturus Studios Inc., Halifax (CA)

(72) Inventors: Devin Horsman, Halifax (CA); Andrew MacIntyre, Halifax (CA); Simon McIlhargey, Halifax (CA)

(73) Assignee: ARCTURUS STUDIOS INC., Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,480

(22) Filed: Mar. 19, 2021

(65) Prior Publication Data

US 2021/0225079 A1  Jul. 22, 2021

Related U.S. Application Data

(63) Continuation of application No. 16/523,014, filed on Jul. 26, 2019, now Pat. No. 10,984,591.

(60) Provisional application No. 62/711,419, filed on Jul. 27, 2018.

(51) Int. Cl.
| | | |
|---|---|---|
| G06T 17/20 | (2006.01) |
| G06T 15/08 | (2011.01) |
| G06T 7/70 | (2017.01) |
| G06T 7/00 | (2017.01) |
| G06T 15/50 | (2011.01) |

(52) U.S. Cl.
CPC .......... G06T 17/205 (2013.01); G06T 7/0014 (2013.01); G06T 7/70 (2017.01); G06T 15/08 (2013.01); G06T 15/503 (2013.01)

(58) Field of Classification Search
None
See application file for complete search history.

(56) References Cited

U.S. PATENT DOCUMENTS

2019/0139297 A1  5/2019  Chen

OTHER PUBLICATIONS

Non-Final Office Action received for U.S. Appl. No. 16/523,014 dated Aug. 21, 2020, 67 pages.
(Continued)

*Primary Examiner* — Nicholas R Wilson
(74) *Attorney, Agent, or Firm* — Amin, Turocy & Watson, LLP

(57) ABSTRACT

Various post-production and distribution tools for volumetric video data are enabled. For instance, a method comprises receiving, by a device comprising a processor, a group of images, determining, by the device, first points of interest of a first image of the group of images and second points of interest of a second image of the group of images, comparing, by the device, the first points of interest to the second points of interest, and determining, by the device, from the first points of interest and the second points of interest and based on a result of the comparing, sets of candidate coordinate positions of a joint of a character represented in the first image and the second image.

20 Claims, 23 Drawing Sheets

(56) References Cited

OTHER PUBLICATIONS

Thiery et al., "ARAPLBS: Robust and Efficient Elasticity-Based Optimization of Weights and Skeleton Joints for Linear Blend Skinning with Parametrized Bones", Computer Graphics Forum, 2017 (Year: 2017).
Qi et al. ("PointNet: Deep Learning on Point Sets for 3D Classification and Segmentation", Proceedings of the IEEE Conference on Computer Vision and Pattern Recognition (CVPR), 2017, pp. 652-660 (Year: 2017).
Carranza et al., "Free-Viewpoint Video of Human Actors", ACM, 2003. (Year: 2003).

VOLUMETRIC DATA POST-PRODUCTION AND DISTRIBUTION SYSTEM

RELATED APPLICATIONS

The subject patent application is a continuation of, and claims priority to, U.S. patent application Ser. No. 16/523,014, filed Jul. 26, 2019, and entitled "VOLUMETRIC DATA POST-PRODUCTION AND DISTRIBUTION SYSTEM," which applications claim further priority to U.S. Provisional Patent Appln. No. 62/711,419, filed Jul. 27, 2018, entitled "Post-Production and Distribution Tools for Volumetric Video Data." The entireties of the aforementioned applications are hereby incorporated by reference herein.

TECHNICAL FIELD

The present disclosure generally relates to post-production and distribution of volumetric data, such as volumetric video.

BACKGROUND

Augmented reality (AR), virtual reality (VR), and other emerging display technologies, such as holographic display or other light projective technologies, etc. are becoming increasingly prevalent. Applications for AR and VR, for example, are continuously being developed for the entertainment sector as well as other sectors such as healthcare and education. According to RedShark News, "[t]he volumetric video market is expected to grow from $578.3 million in 2018 to $2.78 billion by 2023", citing a recent report. Volumetric video frequently involves manipulation such that raw volumetric video content is typically not distributed directly to a consumer. Therefore, post-production and distribution of volumetric content are important components of a complete end-to-end experience involving capture of a volumetric performance and ultimate distribution to consumers of that volumetric performance.

Existing systems and methods for interfacing with volumetric video struggle to facilitate smooth, consistent, reliable editing and distribution of volumetric content. Said systems are slow, inefficient, produce choppy content, and can fail to enable individuals to adjust, tune, and finesse volumetric captures to fit their artistic and production goals.

The above-described background relating to volumetric content is merely intended to provide a contextual overview of some current issues and is not intended to be exhaustive. Other contextual information may become further apparent upon review of the following detailed description.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In one example embodiment, a method is described herein. The method comprises receiving, by a device comprising a processor, a group of images, determining, by the device, first points of interest of a first image of the group of images and second points of interest of a second image of the group of images, comparing, by the device, the first points of interest to the second points of interest, and determining, by the device from the first points of interest and the second points of interest and based on a result of the comparing, sets of candidate coordinate positions of a joint of a character represented in the first image and the second image.

In another example embodiment, a system is described herein. The system comprises a processor and a memory that stores executable instructions that, when executed by the processor, facilitate performance of operations, comprising retrieving a group of images of a humanoid character, determining points of interest of the humanoid character for each image of the group of images, locating each joint of a group of joints of the humanoid character corresponding to the points of interest, and creating a skeletal structure of the humanoid character comprising the group of joints.

In another example embodiment, a machine-readable storage medium is described herein. The machine-readable storage medium comprises executable instructions that, when executed by a processor of a system, facilitate performance of operations, comprising: accessing a volumetric recording of an object, and in response to the accessing, determining points of interest of the object in the volumetric recording, wherein the points of interest comprise surface features of the object, and generating a three dimensional skeletonization corresponding to the points of interest of the object.

In another example embodiment, a method is described herein. The method comprises receiving, by a device comprising a processor, a group of unstabilized meshes comprising a first unstabilized mesh and a second unstabilized mesh, determining, by the device, a first point of the first unstabilized mesh and a second point of the second unstabilized mesh, determining, by the device, a spatial relationship between the first point and the second point, stabilizing, by the device, the first unstabilized mesh and the second unstabilized mesh using the spatial relationship, wherein the stabilizing results in a stabilized mesh, and synthesizing, by the device, a group of stabilized meshes comprising the stabilized mesh, wherein the synthesizing results in a synthesized topology sequence.

In another example embodiment, a system is described herein. The system comprises a processor and a memory that stores executable instructions that, when executed by the processor, facilitate performance of operations, comprising: receiving, by the system, a sequence of UV mapped meshes comprising a first frame and a second frame, determining, by the system, a first point of the first frame and a second point of the second frame, determining, by the system, a spatial relationship between the first point and the second point, stabilizing, by the system, the first frame and the second frame using the spatial relationship, wherein the stabilizing results in a stabilized mesh; and synthesizing, by the system, a group of stabilized meshes comprising the stabilized mesh, wherein the synthesizing results in a synthesized topology texture map sequence.

In another example embodiment, a machine-readable storage medium is described herein. The machine-readable storage medium comprises executable instructions that, when executed by a processor of a system, facilitate performance of operations, comprising: receiving a sequence of UV mapped meshes of a humanoid character comprising different camera positions, stabilizing a topology of the sequence of UV mapped meshes, wherein the stabilizing results in a stabilized mesh, and synthesizing a group of stabilized meshes comprising the stabilized mesh, wherein the synthesizing results in a synthesized topology texture map sequence.

In another example embodiment, a method is described herein. The method comprises receiving, by a device comprising a processor, volumetric data, in response to the receiving, storing, by the device, the volumetric data to a content delivery network, generating, by the device, using the volumetric data, a volumetric video, in response to the generating, determining, by the device, a receiver communicatively coupled to the device, in response to the determining the receiver, determining, by the device, that the volumetric video corresponds to the receiver, and sending, by the device to the receiver, the volumetric video corresponding to the receiver.

In another example embodiment, a system is described herein. The system comprises a processor a memory that stores executable instructions that, when executed by the processor, facilitate performance of operations, comprising: in response to receiving volumetric capture content, storing the volumetric capture content to a content delivery network, generating a group of volumetric videos corresponding to the volumetric capture content, wherein the generating the group of volumetric videos comprises generating common volumetric videos using different bitrates, and segmenting each of the volumetric videos of the group of volumetric videos into respective segments of volumetric video.

In another example embodiment, a machine-readable storage medium is described herein. The machine-readable storage medium comprises executable instructions that, when executed by a processor of a system, facilitate performance of operations, comprising: streaming a first volumetric video comprising a first bitrate, determining a bandwidth, and in response to determining that a bandwidth between a system and a mobile device does not support the first bitrate, streaming a second volumetric video comprising a second bitrate supported by the bandwidth.

In another example embodiment, a method is described herein. The method comprises receiving, by a device comprising a processor, a volumetric mesh comprising a sequence of frames, receiving, by the device, an input comprising a first modification, determining, by the device, the first modification of a first frame of the sequence of frames, and generating, by the device, a second modification to a second frame, wherein the second modification corresponds to the first modification, and wherein the second frame is different from the first frame.

In yet another example embodiment, a system is described herein. The system comprises a processor and a memory that stores executable instructions that, when executed by the processor, facilitate performance of operations, comprising: receiving a volumetric mesh comprising a sequence of frames, receiving an input comprising a first modification to a first frame of the sequence of frames, determining an application of the first modification to the first frame, and generating a second modification for a second frame, wherein the second modification corresponds to the first modification, and wherein the second frame is different from the first frame.

In a further example embodiment, a machine-readable storage medium is described herein. The machine-readable storage medium comprises executable instructions that, when executed by a processor of a system, facilitate performance of operations, comprising: receiving a volumetric mesh series comprising an object comprising a surface, receiving instructions to modify the surface, determining a first modification to a first mesh of the volumetric mesh series, applying the first modification to the first mesh, determining a second modification corresponding to the first modification for a second mesh of the volumetric mesh series, and applying the second modification to the second mesh.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
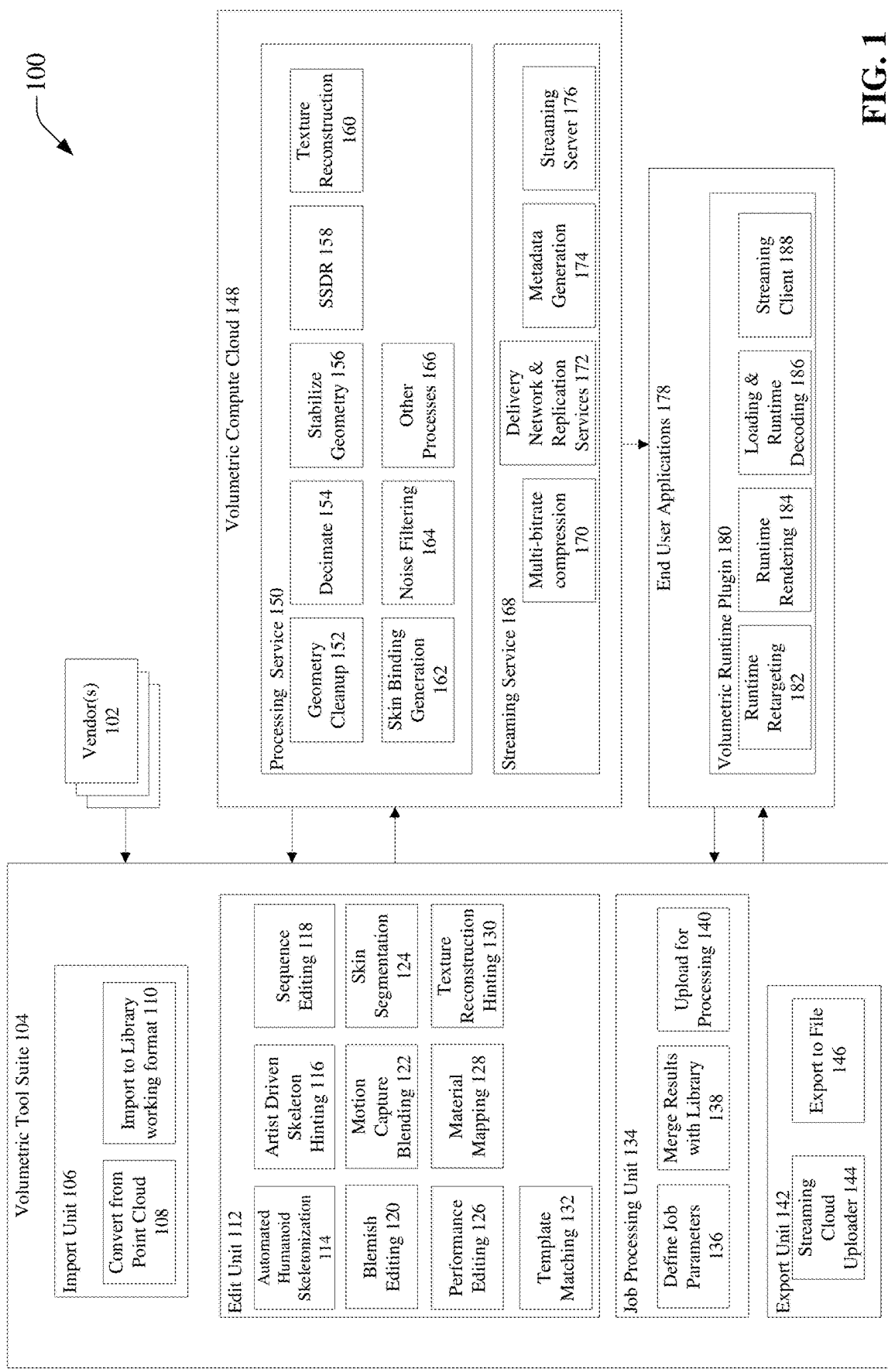
FIG. 1 is a process diagram depicting an example system for volumetric data post-production and distribution in accordance with one or more example embodiments described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide methods and systems that enable and facilitate post-production and distribution of volumetric data. Various embodiments herein enable artists, editors, creatives, and others to seamlessly edit, produce, and distribute immersive volumetric content. For example, a user of a system described herein can modify a volumetric recording of a performance with such precision and smoothness that an edited volumetric recording can appear as if originally recorded with the modifications. For instance, HoloSuite, by Arcturus can possess the aforementioned functionality as further described below.

By utilizing the systems and methods provided herein, a volumetric video suite can perform a variety of functions. For example, volumetric data (e.g., a group of images, a volumetric video capture, a volumes video recording, a volumetric mesh sequence, etc.) can be received by a volumetric tool suite. A large variety of operations can be performed on the received volumetric data. For instance, points in a group of images of a human can be determined. The points can correspond to identifiable characteristics of the human (e.g. a joint). For each image, the points can be compared. Confidence levels corresponding to joint location or point location can be determined for each image. From the points, three dimensional joints corresponding to the human can be determined. The joints can be representative of the actual joints possessed by the human. A joint rig can be generated from the determined joints. Linear blended vertex skinning weights can be generated following joint rig generation.

In other various embodiments described herein, UV stabilization of per-frame texture maps can occur. For instance, a group of unstabilized meshes can be received. The group of unstabilized meshes can comprise volumetric data. From the group of unstabilized meshes, a base mesh can be determined. The base mesh can be registered to poses of other frames. Keyframes can be determined. Next, sequence extents can be determined. The group of unstabilized meshes can be taken from a plurality of different cameras or camera angles. Therefore, it can be determined which camera angle/view and accompanying data to use for a given triangle in a multi-view environment. Textures can be resampled and frames can be concatenated. The process results in stabilized, synthesized meshes.

In other embodiments, adaptive streaming can occur. For instance, volumetric data can be received. The volumetric data can be stored and used to generate volumetric videos. The volumetric videos can be the same video of varying bitrates. The volumetric videos can be stored for later sending or streaming. After a receiver is communicatively coupled to an adaptive streaming system, information about the receiver can be determined. For instance, the bandwidth between the adaptive streaming system and the receiver can be determined, in addition to the type of device, screen size, screen resolution, etc. A volumetric video of the volumetric videos can be determined to be the presently optimal video to send or stream. The video can then be sent or streamed to the receiver device. The adaptive streaming system can continuously monitor the conditions between the adaptive streaming system and the receiver in case a volumetric video change needs to occur. For instance, a receiver can be a smart phone. The smart phone can switch from a Wi-Fi connection to a cellular-based connection and may have a reduced bandwidth as a result. The adaptive streaming system can detect the reduced bandwidth and change the volumetric video to one of a lower bandwidth. Each video can be segmented such that transitions between videos can be smooth and seamless.

Further embodiments herein relate to template matching. For instance, a volumetric mesh comprising a sequence of frames can be received. An input to modify the volumetric mesh can be received. For example, a user (e.g. artist) of a template matching system can make an edit to a frame of the sequence of frames. The template matching system can determine from the input what first modifications to the frame were made. The template matching system can then generate a second modification corresponding to first modifications received from the user. The second modification can be applied to a second frame. Additional modifications like the second modification (and first modification) can be made to additional frames. According to an embodiment, a modification to a frame received from a user can be applied to all frames with seamless and smooth transitions between.

The above aspects of the disclosure and/or other features of respective embodiments thereof are described in further detail with respect to the respective drawings below.

With reference to FIG. 1, diagram 100 illustrates various components and subcomponents of a Volumetric Data Post-Production and Distribution System. Vendor(s) 102 can comprise sources for volumetric data. For instance, Vendor(s) 102 can be a $3^{rd}$ party source of volumetric data. A Vendor 102 can be registered to communicate with a Volumetric Tool Suite 104 comprising an Import Unit 106. Volumetric data received from a Vendor 102 can converted from a point cloud format if necessary at Convert from Point Cloud 108 and can then proceed to Import to Library Working Format 110. If conversion from point cloud is not required for volumetric data received from a Vendor 102, the volumetric data from Vendor 102 can proceed directly to Import to Library Working Format 110. Keyframes of a volumetric video or volumetric data can be determined. Volumetric data can comprise a single source camera or, more typically, from a plurality of source cameras. The plurality of cameras can be utilized to generate a volumetric video from two dimensional videos captures by each cameras of the plurality of cameras. A working format can comprise file formats compatible with the volumetric data post-production and distribution system. The volumetric data post production and distribution system can support inputs of: point cloud—colored or not colored (ply point cloud), mesh—with UV mapping or with Multi View Environment (MVE), stabilized mesh (Sequence of meshes with stable UVs/vertex-face relationships), texture sequence (.png), Smooth Skinning Decomposition with Rigid Bones (SSDR) sequence, etc.

After volumetric data has been processed by the Import Unit 106, it can proceed to the Edit Unit 112 or Job Processing Unit 134, or another unit. The Edit Unit 112 comprises a variety of editing tools. Automated Humanoid Skeletonization 114, as will described in greater detail, provides for generation of a proxy skeletal rig for editing motions. Artist Driven Skeleton Hinting 116 can allow for a user (e.g. an artist) to provide input to adjust a skeletonization. For instance, an artist can adjust a skeletonization generated by the Edit Unit 112 at Automated Humanoid Skeletonization 114. An adjustment can comprise a positional or rotational adjustment of a joint or a bone of a skeleton as skeletonized on a human or humanoid object. The Edit Unit 112 can also perform Sequence Editing 118. Sequence Editing 118 can comprise editing a sequence or group of sequences of a volumetric video (or a traditional two dimensional video). For instance, Sequence Editing 118 can include editing a series of volumetric videos without having to individually edit each individual volumetric video of the series of volumetric videos. Sequence Editing 118 can also include editing different versions of the same volumetric video. According to an embodiment, a volumetric video can comprise multiple versions of varying bitrates. Sequence Editing 118 can allow for the multiple versions to be edited at once without needing to edit each individual video. Additionally, variations of the edits can be implemented for each video of the multiple versions. The Edit Unit 112 can implement Blemish Editing 120. Blemish Editing 120 can improve perceived imperfections in a volumetric video, holistically or on a frame-by-frame basis. Imperfections can be detected by the volumetric data post-production and distribution system by a user of the volumetric data post-production and distribution system. Blemish Editing 120 can be performed frame-by-frame or can be performed across multiple frames or sequences. An imperfection can comprise a skin blemish of a human or humanoid object (e.g. acne, sunburn, wrinkle, hair, etc.) or as otherwise stored in a library of the volumetric data post-production and distribution system or determined by a user of volumetric data post-production and distribution system. Additionally, Blemish Editing 120 can comprise automatic recognition of imperfections, without requiring user-input.

Motion Capture Blending 122 can enable blending of movements of a human or humanoid object (or other captured or recorded object) to allow for smooth transitions. The Motion Capture Blending 122 can occur between keyframes or between other frames of a Volumetric Capture. Skin Segmentation 124 can allow for improved realism of skin characteristics (such as skin color, skin pattern, skin imperfections, body hair, impact of light on skin, impact of objects on skin appearance, etc.) in a volumetric video. Performance Editing 126 can enable modification of humanoid rigs. For instance, a humanoid rig can be skeletonized as in Automated Humanoid Skeletonization 114. Performance Editing 126 can allow limbs, head/neck, body, clothing/accessories, etc. to be changed after a performance has been recorded. A humanoid rig corresponding to an actual human can be subjected to Performance Editing 126 to allow a variation of a performance to be generated. For instance, a human may look to the left, but a humanoid rig corresponding to the human may be subjected to Performance Editing 126 to replace the look to the left with a look to the right. Realtime retargeting through inverse kinematics can be executed. Motion capture libraries containing exemplary motions can contain a motion determined by the volumetric data post-production and distribution system to correspond to a motion of a performance. The motion can therefore be improved, smoothed, or have realism improved such that missing or weak performances can be improved. Performance Editing 126 can cause a secondary skeletonization with bones from compression to be generated.

Material Mapping 128, or texture mapping as will be described later in greater detail, can cause a mesh of a volumetric capture to be stabilized and synthesized. Material Mapping 128 can reduce pattern distortion thus improving surface realism. Material Mapping 128 can adjust the appearance of materials or textures of a human or humanoid rig in a volumetric capture. Texture Reconstruction Hinting 130 can allow for adjustments to Material Mapping 128 to be made by a user of the Volumetric Data Post-Production and Distribution System. For instance, Material Mapping 128 may determine a specific texture adjustment. Texture Reconstruction Hinting 130 can allow a user to adjust that specific texture adjustment.

Template Matching 132, as will be described later in greater detail, can allow for modifications to a volumetric capture comprising a series of frames to be editing without an appearance of jitter.

Additionally, deformation can occur, resulting in performing of coarse registration and fine registration. Fine registration can use an "as rigid as possible" technique to deform a mesh towards a shape of another while minimizing the area of each triangle in the source, which can allow for more fine details of the target surface to be added in the source mesh.

Job Processing Unit 134 of the Volumetric Tool Suite 104 can perform various functions. For instance, Job Processing Unit 134 Define Job Parameters 136. Job parameters can be defined in accordance with user preferences or as optimized by the volumetric data post-production and distribution system. Job Processing Unit 134 can Merge Results with Library 138. Merge Results with Library 138 can cause a job or a project to be merged with a library stored in the volumetric data post-production and distribution system. Job Processing Unit 134 can additionally Upload for Processing 140. Upload for Processing 140 can cause an edited or unedited volumetric capture to be uploaded to a server communicatively coupled to the volumetric data post-production and distribution system, or to a subcomponent of the volumetric data post-production and distribution system.

Export Unit 142 of the Volumetric Tool Suite 104 can perform a variety of functions. For instance, Export Unit 142 can comprise a Streaming Cloud Uploader 144. Streaming Cloud Uploader 144 can upload a volumetric video to a server. The upload can include a single volumetric video or multiple volumetric videos, including separate volumetric videos or variations of the same volumetric video. Export Unit 142 comprise Export to File subunit 146. Export to File 146 can utilize a file format (e.g. Open Mesh Sequence (OMS) file) for volumetric video generated by the volumetric data post-production and distribution system.

A Volumetric Compute Cloud 148 can be communicatively coupled to a Volumetric Tool Suite 104 and an End User Applications 178. The Volumetric Compute Cloud 148 can comprise Processing Service 150 and Streaming Service 168. The Processing Service 150 can receive data such as a volumetric video from an Export Unit 142. Processing Service 150 can comprise a variety of sub-services. For instance, Geometry Cleanup 152 can correct geometric problems in a volumetric video uploaded to the Compute Cloud 148. Decimate 154 can reduce polygon count to a target. UV's can be preserved if present. At Stabilize Geometry 156, stabilized mesh sequences can be dynamically or manually built from keyframes non-rigidly deformed into neighboring frames.

Processing Service 150 can perform SSDR 158. SSDR 158 can allow for the compression of multiple frames in an animation into a single mesh, some bones and an appropriate skinning. Compression be performed, utilizing keyframe and delta compression and can result in a file format which can be utilized by the volumetric data post-production and distribution system. Since the meshes that are generated during texture packing differ from the meshes created during retargeting, and a .dat file from SSDR is built for a mesh that looks like the retargeted mesh, the vertex attributes of all three can be combined.

Processing Service 150 can additionally perform Texture Reconstruction 160. Here, a mesh and MVE can be used to generate a mesh with UV's and texture. Processing Service 150 can further perform Skin Binding Generation 162. Skin Binding Generation 162 can bind a skin or a surface texture of a human, humanoid rig, or other object to a skeletonization associated with the human, humanoid rig, or object. Processing Service 150 can conduct Noise Filtering 164. Noise Filtering 164 can be performed to reduce noise of a volumetric video, such that graininess or other noise-related quality issues can be reduced or eliminated, resulting in a video with no noise or minimal noise. Processing Service 150 can additionally perform Other Processes 166 as would be understood by one skilled in the art.

Streaming Service 168 can perform adaptive streaming, as will be later discussed in greater detail. For instance, Streaming Service 168 can perform Multi-Bitrate Compression 170. Multi-Bitrate Compression 170 can result in a set of volumetric videos having the same content at different bitrates. Delivery Network & Replication Services 172 can facilitate delivery and replications of volumetric videos or other volumetric content. For instance, volumetric content or video can be copied, moved, or otherwise migrated to a replication service (e.g. a content delivery network). Metadata Generation 174 can be performed so that information about a volumetric video stored in the Volumetric Compute Cloud 148 can have associated metadata generated at Metadata Generation 174. Streaming Service 168 can comprise a Streaming Server 176. Streaming Server 176 can store output files resulting from Multi-Bitrate Compression 170. Streaming Server 176 can additionally store any volumetric data, volumetric video or traditional video for immediate consumption or for later consumption. Streaming Server 176 can be utilized to send or stream volumetric content to a receiver communicatively coupled to the volumetric data post-production and distribution system.

End User Applications 178 can be communicatively coupled to the Volumetric Tool Suite 104 or the Volumetric Compute Cloud 148. End User Applications can comprise a Volumetric Runtime Plugin 180. Volumetric Runtime Plugin 180 can enable a variety of functions relating to OMS files or other volumetric video content. For instance, Volumetric Runtime Plugin 180 can enable Runtime Retargeting 182 to be performed. According to an embodiment, Runtime Retargeting can facilitate a character swap. For example, a first humanoid rig can be replaced with a second humanoid rig, wherein the first humanoid rig and the second humanoid rig share a common skeleton. Humanoid rig proportions can be maintained and adapted to the common skeleton. Additionally, even if a skeleton is not shared between a first humanoid rig and a second humanoid rig, Runtime Retargeting can still occur if the first humanoid rig and the second humanoid rig share common characteristics. Runtime Rendering 184 can additionally be enabled by the Volumetric Runtime Plugin 180 to enable runtime rendering of content. For instance, modifications to a humanoid rig can be made in real team (e.g. live) during playback of volumetric content. Said modifications can be made and rendered in during playback to facilitate a smooth, seamless experience during playback of volumetric content. Loading & Runtime Decoding 186 can facilitate loading of content and runtime decoding of the content, e.g., to facilitate runtime rendering by Runtime Rendering 184. As an example, a volumetrically recorded character can have a head and a face. A user of a Volumetric Runtime Plugin 180 can move around the character in three-dimensional space. The head of the volumetrically recorded character can move such that the face of the volumetrically recorded character follows the movement by the user, such that the face is always visible by the user. The head movement can have natural human-like limitations, such that the head does not make impossible movements (e.g. turning 360 degrees) and can accordingly make a more natural adjustment such as changing body orientating to account for additionally needed face rotation.

The Volumetric Runtime Plugin 180 can be utilized by a Streaming Client 188. For instance, Streaming Client 188 can be enabled to interact with and playback an OMS-type file or other volumetric video format.

Project data can be split into two varieties: source assets and working assets. Source assets can be the assets productions use to interop with other programs and tools, and working assets are optimized (sometimes for space, sometimes for loading time) binary assets with interdependencies used for working in a volumetric data post-production and distribution system (e.g. HoloSuite). Working assets can also be called library assets. Some library assets can be representations of the source assets a user imports into HoloSuite, while others can be created in HoloSuite and can represent transformations (e.g. a decimated mesh) or containers (e.g. a clip containing a set of meshes) of the original data. Library assets (including those generated as intermediates in HoloSuite) can be exported to interoperable source assets for interoperability with other software. The asset library can operate in a way such that it can be partially replicated in different storage locations. For instance, to compute a transformation on a set of data, only the file required for that computation and the library index are transferred to the working cluster node, and only the results are transferred back. In this way, the library can be partially or fully replicated for processing or project sharing, respectively.

Processes in the volumetric data post-production and distribution system can represent transformations on data streams. A process can have a parameter set, input type(s), verification routine, and output type(s). Processes may be executed locally or in the cloud. Processes can be supported by a plugin architecture or can be user provided. Processes execute on Library data. After processing, transformed data is merged into the library.

Work in the volumetric data post-production and distribution system can be done through specifying transformations on data in a "composition". It can consist of a set of tracks which consist of a waterfall of transformations to data by processes in stages. Each stage can be driven by intervals which set the parameters of the process used to transform the data. The timeline view in the volumetric data post-production and distribution system allows the user to interactively edit the composition and view processing progress.

Inputs supported by the volumetric data post-production and distribution system can include: point cloud: colored or not colored (ply point cloud), mesh: with UV mapping or with an MVE, stabilized mesh (sequence of meshes with stable UVs/vertex-face relationships), texture sequence (png), SSDR Sequence, etc.

Outputs supported by the volumetric data post-production and distribution system can include: OMS, OBJ sequence, FBX (SSDR, skeleton animation), Skin binding, PNG Sequence, MP4 (surface color video), etc.

Quality Checking can occur, which can determine a quality of a volumetric video and compare with a threshold quality level. For instance, a Hausdorff distance can be normalized by scaling it with the diagonal of the bounding volume. The Hausdorff distance can comprise the largest distance a between the closet vert pairing using the deformed mesh and its target. Additionally, the difference in volume between the deformed mesh and its target can be measured.

Figure 2:
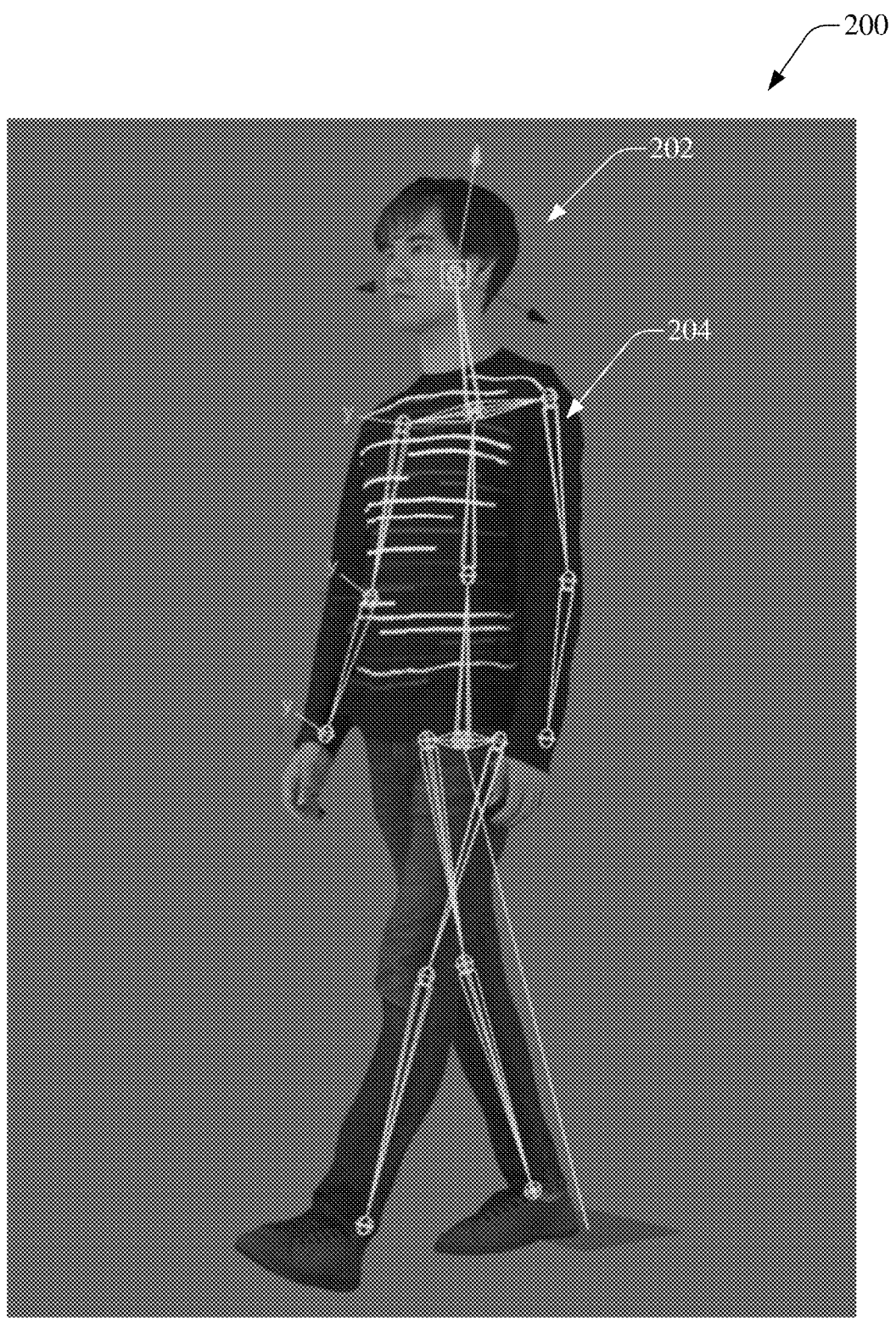
FIG. 2 is an exemplary skeletonization by a volumetric data post-production system in accordance with one or more example embodiments described herein.

Turning now to FIG. 2, skeletonization 200 illustrates a three dimensional skeletonization of a Humanoid Character 202. For instance, a Skeleton 204 can be generated which corresponds to the structure of the Humanoid Character 202. The Skeleton 204 can be generated, for instance, at Automated Humanoid Skeletonization 114.

Figure 3:
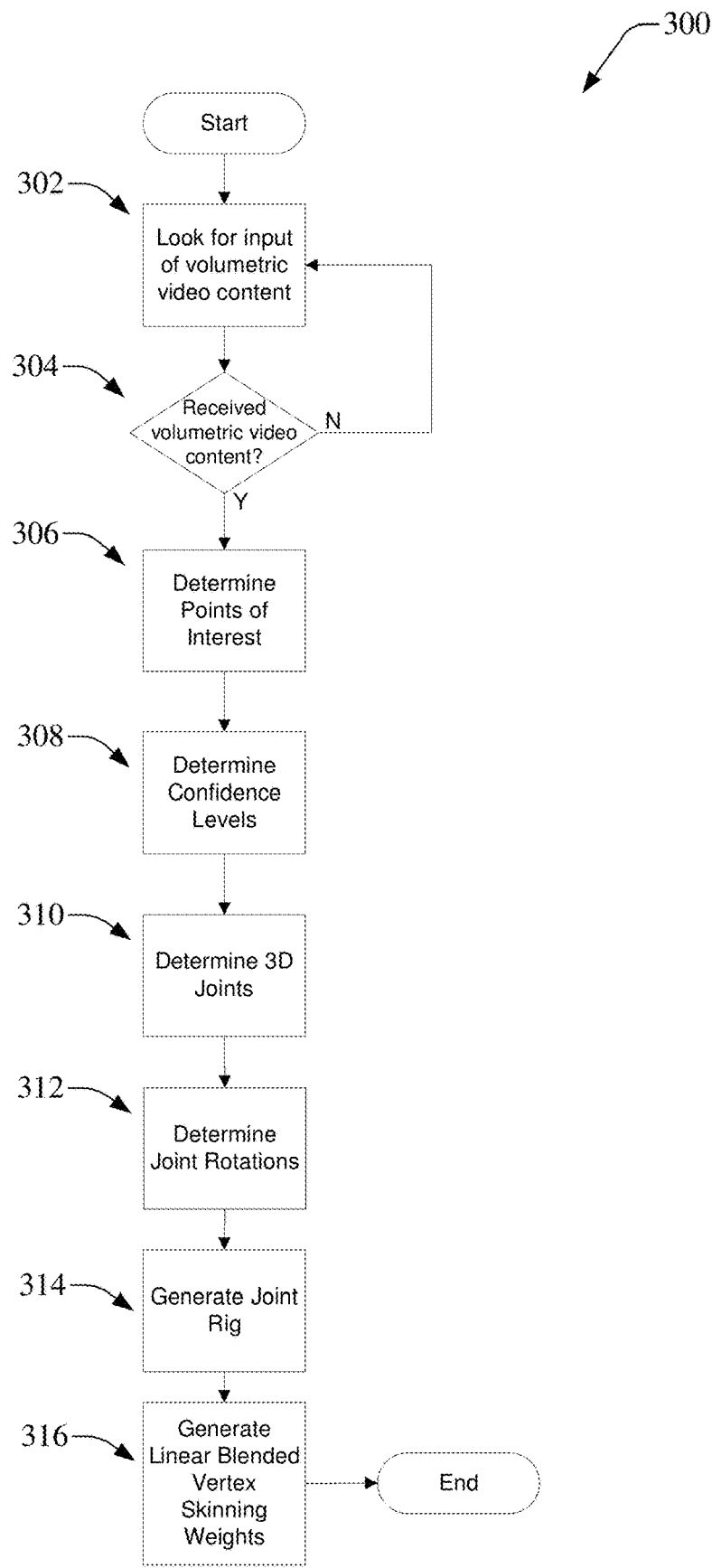
FIG. 3 is a flowchart of an example method for automated rigging of volumetric data in accordance with one or more example embodiments described herein.

Turning now to FIG. 3, a flowchart of a process 300 for automated rigging of volumetric humanoid characters for post-capture performance editing is shown. At 302, a Volumetric Data Post-Production and Distribution System can look for an input of volumetric video content. If at 304, volumetric video content is determined to be not received, the system returns to 302. If at 304, volumetric video content is determined to be received, then the system proceeds to 306. At 306, points of interest (e.g. of a human) are determined. The points of interest are calculated from a single 2D image and correspond to points like the eyes, ears, neck, shoulder, hips, etc. At 308, a confidence level for each correspondence can be determined. Since the points of interest can be calculated from a single 2D image, more accurate locations can be determined by calculating the best fit from multiple camera angles using a non-linear least squares minimization with a loss function that includes the confidence associated with each of the residuals, and by accounting for rigidity of the distance between key points across frames. A final coordinate position of a joint can comprise a set of sets of candidate coordinate positions having at least a threshold confidence level among the respective confidence levels of the sets of candidate coordinate positions. This can yield a set of 3D points (e.g. root, eyes, ears, shoulders, elbows, wrist, hips, knees, ankles, bottom of neck/lower neck). Joint locations can be used to generate and determine bones corresponding to the joint locations of a skeletal structure. For an image of a group of images, a first set of linear blended bone weights for vertices of the skeletal structure and a second set of linear blended bone weights for vertices of the skeletal structure, wherein the vertices comprise information representative of the first joint and the second joint. The first set of linear blended bone weights for the vertices of the skeletal structure and the second set of linear blended bone weights for the vertices of the skeletal structure can be reduced, comprising blending the first set of linear blended bone weights and the second set of linear blended bone weights to a final set of linear blended bone weights for the vertices of the skeletal structure. At 310, 3D Joints are determined using the 3D points. For instance, root (between hips), hips, knees, ankles, shoulders, elbows, wrist, lower neck, or upper neck can be determined. The root can be determined by taking the average position of the hips and the upper neck by generating a point 75% of the distance along the vector from the lower neck to the average position of the ears. After determining the root, joint rotations can be determined at 312. A skeleton root forward can be determined by the cross product of the vectors from root to the lower neck and the left to right hip. Hip, knee and ankle axis can be determined with a cross product of knee-hip and ankle-hip. Shoulder and elbow can be determined with a cross product of elbow-shoulder and wrist, shoulder. Upper neck can be determined from the cross product of average position of the eyes-upper neck and lower neck—upper neck. At 314, a joint rig can be generated utilizing the 3D Joints and the Joint Rotations. It can also be appreciated that an orientation of the joint rig comprising a skeletal structure can be determined, for instance, using the root, the left hip, the right hip, or the lower neck. At 316, linear blended vertex skinning weights can be generated. Linear blended vertex skinning weights can be generated on a per-keyframe basis or for each frame, trading off between using less memory and quality. This can result in a mesh of a character being skinned corresponding to a final set of linear blended bone weights.

Subsequent compression for volumetric data can use linear blended bone weights to compress keyframed sequences of data. SSDR linear blended bones can be used to create a lower dimension encoding of vertex positions (deltas) for non-keyframes. The delivery format of content can utilize a stream of mesh data with keyframes and non-keyframes. Keyframes can comprise a mesh vertex, normal and triangle index stream, SSDR bone bindings/initial pose, and a humanoid bone binding/initial pose. For non-keyframes, SSDR bone transforms and humanoid bone transforms can be utilized. To reconstruct the pose for frame n in a keyframe sequence of with a keyframe at frame k, the vertices in k can be transformed by SSDR transformations for frame n:

$$pos[v,n]=SUM[i \ldots ](SSDRboneT[i,n]*pos[v,k]*weight[i,v])$$

where $pos[v,j]$ is the position of vertex v for the jth frame, $boneT[i,j]$ is the transformation matrix for the ith bone for the jth frame, and $weight[i]$ is the bone weight for the ith bone to vertex v. There are typically up to 300 SSDR bones, with each vertex typically having a maximum of 4 linear blended bone transforms contributing to their position. A humanoid bone binding exists for each keyframe and assumes the mesh has already been transformed into the pose for frame n, and that is then used to transform the vertex again based on the dynamic humanoid skeleton pose for the currently displayed frame:

$$pos[v,n]=SUM[i \ldots ](HumanoidBoneT[i]*pos[v,k]*weight[i,v])$$

where i is the ith humanoid bone, $pos^*[v, n]$ is the position of vertex v in the dynamic pose, and $HumanoidBoneT[i]$ is current dynamic transformation of the ith bone from the initial bone pose for that bone.

According to an embodiment, a set of n 3d points P (3×N) from m sets of homologous (the same points in m views) 2D feature points of evidence E (2×M×N) viewable from m cameras with world space pose matrices C1 . . . Cm is to be found. A least squares minimization problem can be generated to find the set of n 3d points. An exemplary cost function for a given point P[i] is:

$$\sum_{j}^{m} (C[j] \cdot \text{transform}(P[i]) - E[i][j])^2$$

where P[i] is the ith 3d point (constant in this sum), and E[i][j] is the jth camera's 2d projection of p[i]. This is the cost function for a single 3D point. All together there are n such cost functions. One residual block for each P[i] can exist. In total the expression:

$$\sum_{i}^{n} \sum_{j}^{m} ((C[j] \cdot \text{transform}(P[i]) - E[i][j])^2)$$

for P with E and C fixed is to be minimized.

Figure 4:
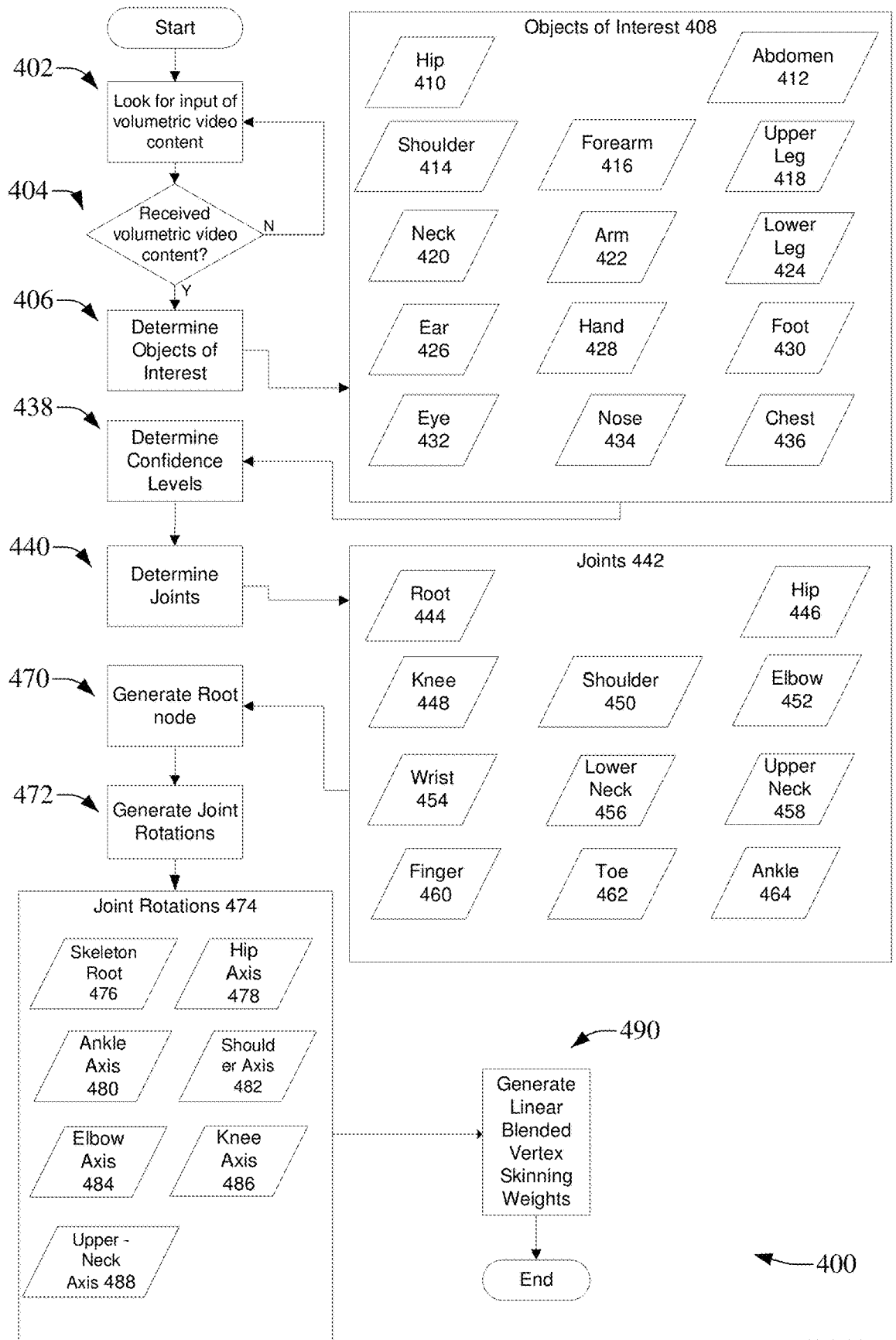
FIG. 4 is a flowchart of an example method for automated rigging of volumetric data in accordance with one or more example embodiments described herein.

Turning to FIG. 4, a flowchart of a process 400 for automated rigging of volumetric humanoid characters for post-capture performance editing is shown. At 402, a Volumetric Data Post-Production and Distribution System can look for an input of volumetric video content. If at 404, volumetric video content is determined to be not received, the system returns to 402. If at 404, volumetric video content is determined to be received, then the system proceeds to 406. At 406, objects of interest of are determined. The objects of interest can be calculated from a single 2D image and can correspond to points like the eyes, ears, neck, shoulder, hips, etc. For instance, Objects of Interest 408 can comprise Hip 410, Abdomen 412, Shoulder 414, Forearm 416, Upper Leg 418, Neck 420, Arm 422, Lower Leg 424, Ear 426, Hand 428, Foot 430, Eye 432, Nose 434, and Chest 436. For each of the Objects of Interest 408, confidence levels can be determined at 438. Since the Objects of Interest 408 of interest can be calculated from a single 2D image, more accurate locations can be determined by calculating the best fit from multiple camera angles using a non-linear least squares minimization with a loss function that includes the confidence associated with each of the residuals and by accounting for rigidity of the distance between key points across frames. At 440, objects of interest can be used to determine Joints 442. Joints 442 can comprise Root 444, Hip 446, Knee 448, Shoulder 450, Elbow 452, Wrist 454, Lower Neck 456, Upper Neck 458, Finger 460, Toe 462, or Ankle 464. The root node can be generated at 470 by taking the average position of the hips and the upper neck by generating a point about 75% of the distance along the vector from the lower neck to the average position of the ears. After determining the root, Joint Rotations 474 including a Skeleton Root 476, Hip Axis 478, Ankle Axis 480, Shoulder Axis 482, Elbow Axis 484, Knee Axis 486, or Upper-Neck Axis 488 can be generated at 472. At 490, linear blended vertex skinning weights can be generated.

Figure 5:
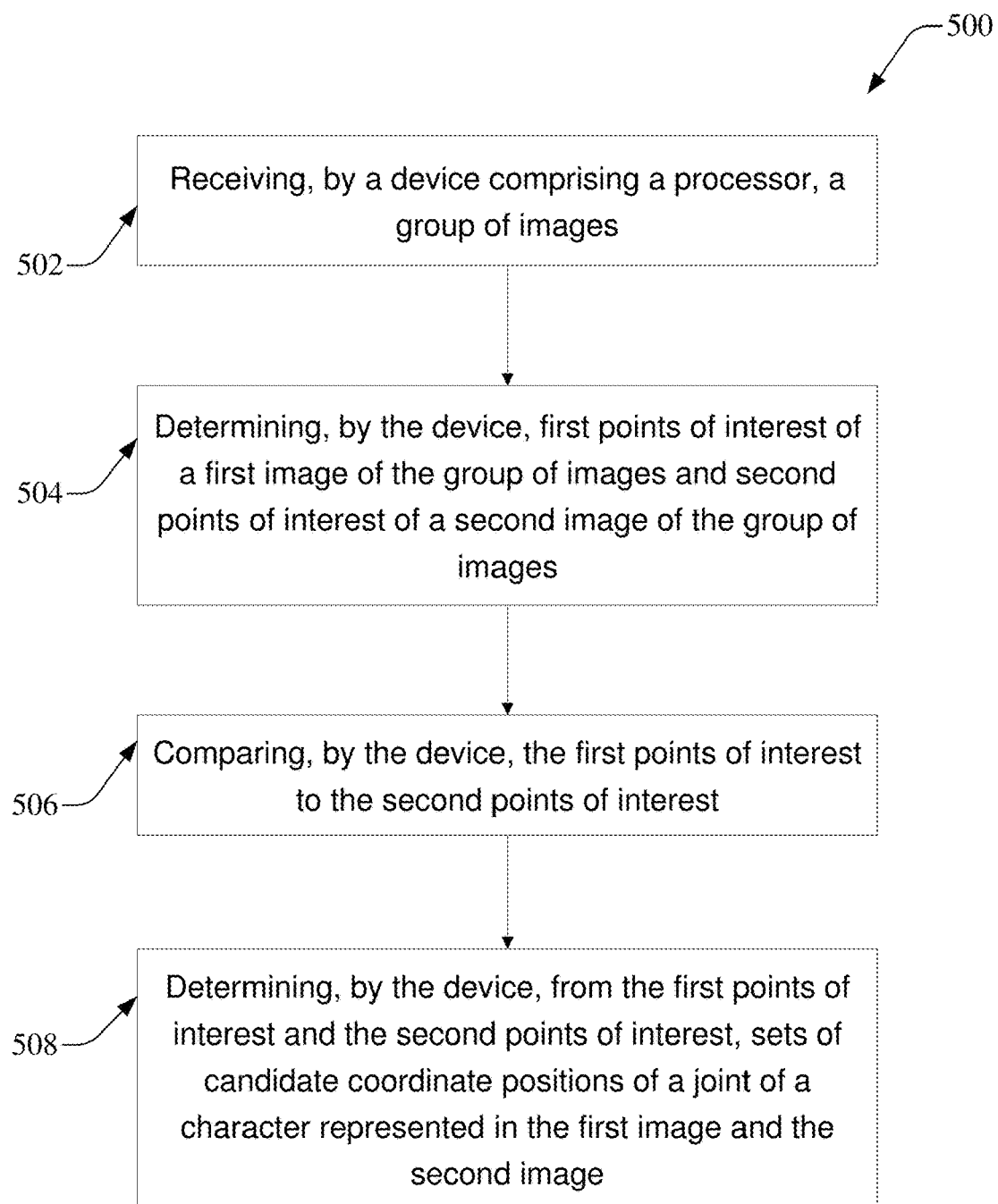
FIG. 5 is a block flow diagram for a process for a method in which a group of images is received and candidate coordinates are ultimately determined in accordance with one or more example embodiments described herein.

Turning next to FIG. 5, illustrated is a flow diagram of a process 500 for automated rigging in accordance with one or more embodiments described herein. At 502, a device comprising a processor receives a group of images. At 504, the device determines first points of interest of a first image of the group of images and second points of interest of a second image of the group of images. At 506, the device compares the first points of interest to the second points of interest. At 508, the device determines from the first points of interest and the second points of interest, sets of candidate coordinate positions of a joint of a character represented in the first image and the second image.

It can be appreciated that the first image can be captured from a first vantage point applicable to a scene in which the character is represented, and the second image is captured from a second vantage point applicable to the scene. Respective images of the groups of images can comprise respective location data corresponding to respective locations of capture of the respective images. A first location of capture of the first image can define the first vantage point and a second location of capture of the second image can define the second vantage point.

Figure 6:
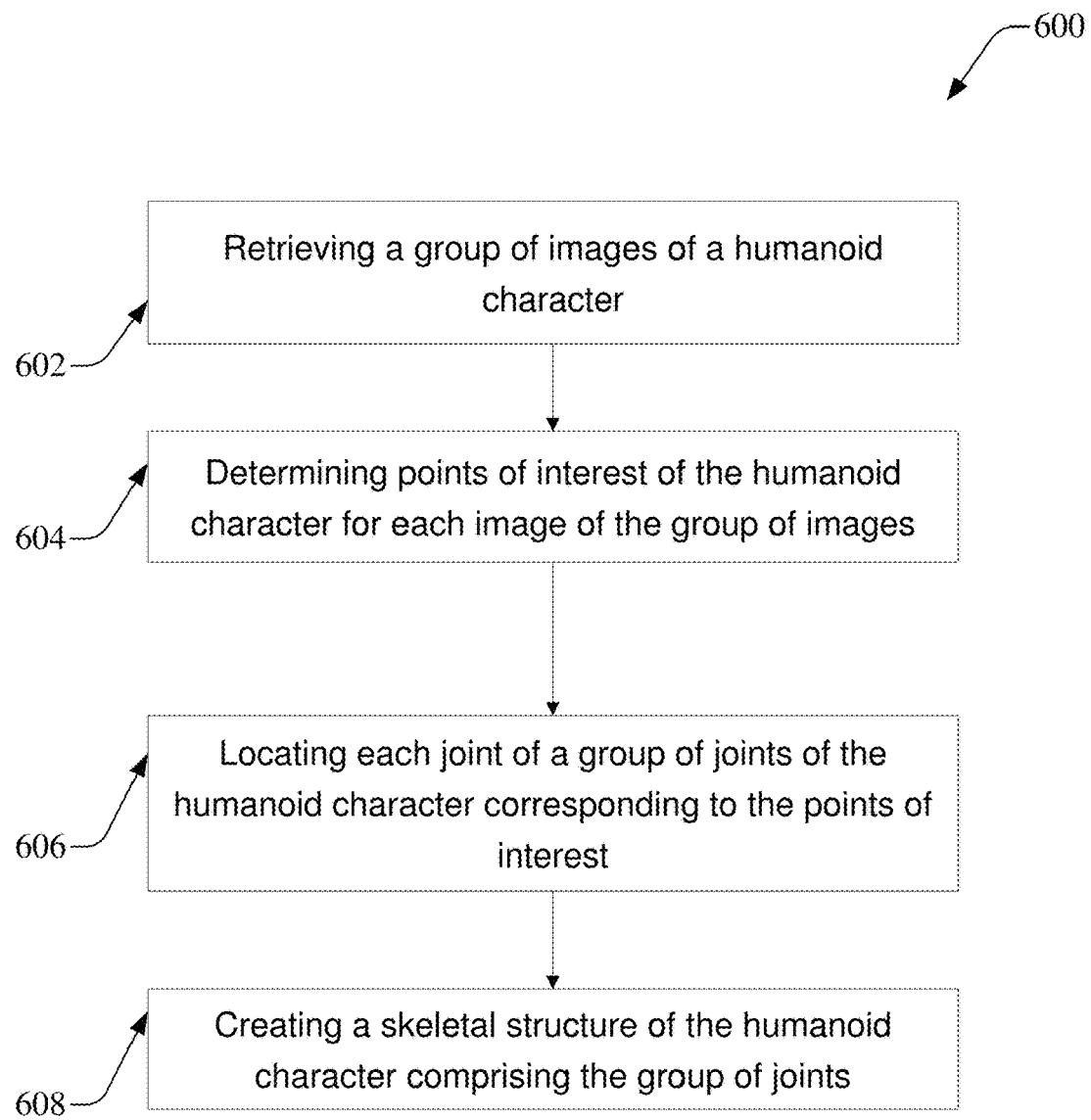
FIG. 6 is a block flow diagram for a process for a system in which the system retrieves a group of images of a humanoid character and ultimately creates a skeletal structure of the humanoid character in accordance with one or more example embodiments described herein.

Turning next to FIG. 6, illustrated is a flow diagram of a process 600 for automated rigging in accordance with one or more embodiments described herein. At 602, a system retrieves a group of images of a humanoid character. At 604, the system determines points of interest of the humanoid character for each image of the group of images. At 606, the system locates each joint of a group of joints of the humanoid character corresponding to the points of interest. At 608, the system creates a skeletal structure of the humanoid character comprising the group of joints. It can be appreciated that a location of a joint can be associated with a time of capture of an image of the joint.

Figure 7:
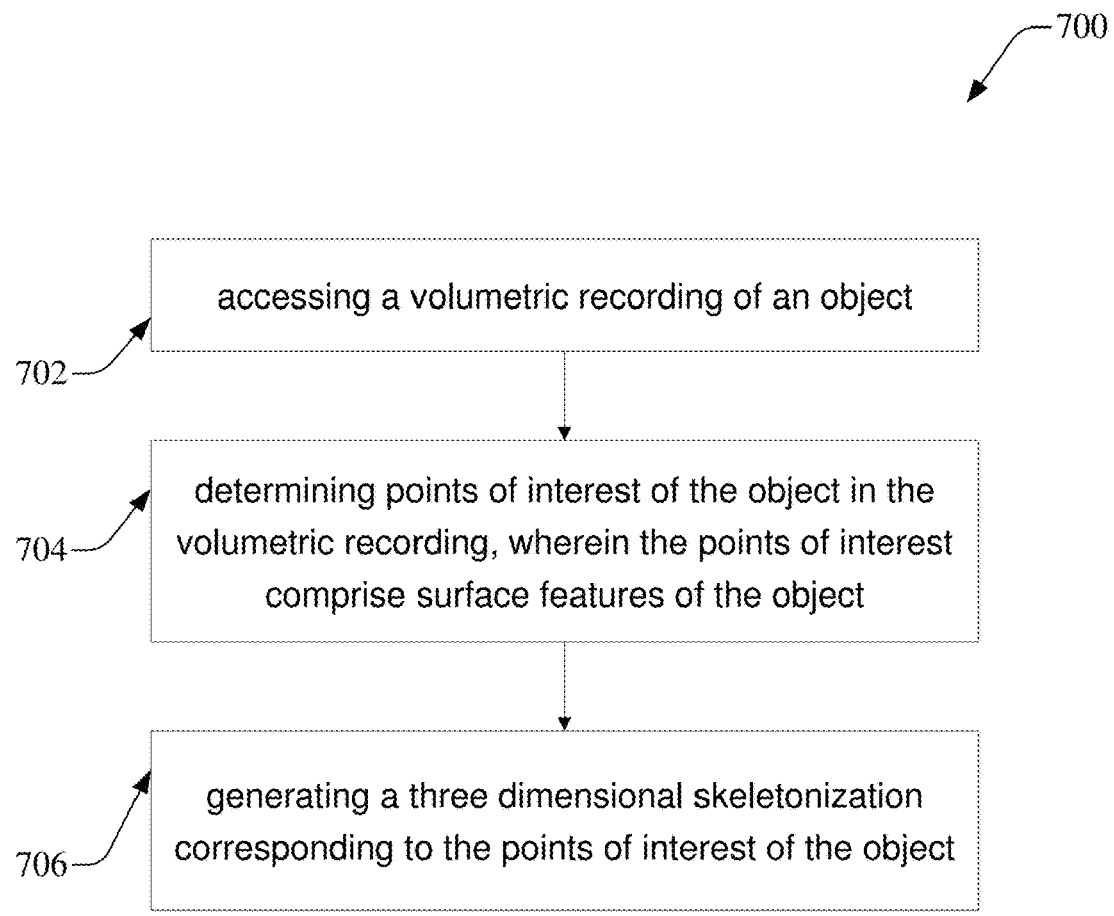
FIG. 7 is a block flow diagram for a process for a machine-readable storage medium in which a volumetric recording of an object is accessed and a three dimensional skeletonization is ultimately generated in accordance with one or more example embodiments described herein.

Turning next to FIG. 7, illustrated is a flow diagram of a process 700 for automated rigging in accordance with one or more embodiments described herein. At 702, a volumetric recording of an object is accessed. At 704, points of interest of the object in the volumetric recording are determined, wherein the points of interest comprise surface features of the object. At 706, a three dimensional skeletonization corresponding to the points of interest of the object is generated. The object can be a first object, wherein the surface features can be determined to be characteristics of the first object, and wherein the points of interest of the first object can be determined by mapping the points of interest of the first object to a second object, stored in association with the system, that satisfy a similarity criterion for being similar to the first object. The three dimensional skeletonization can be exported, for example, to a cloud server or to a local storage. The aforementioned points of interest can additionally comprise homologous three dimensional coordinates from the group of recordings.

Figure 8:
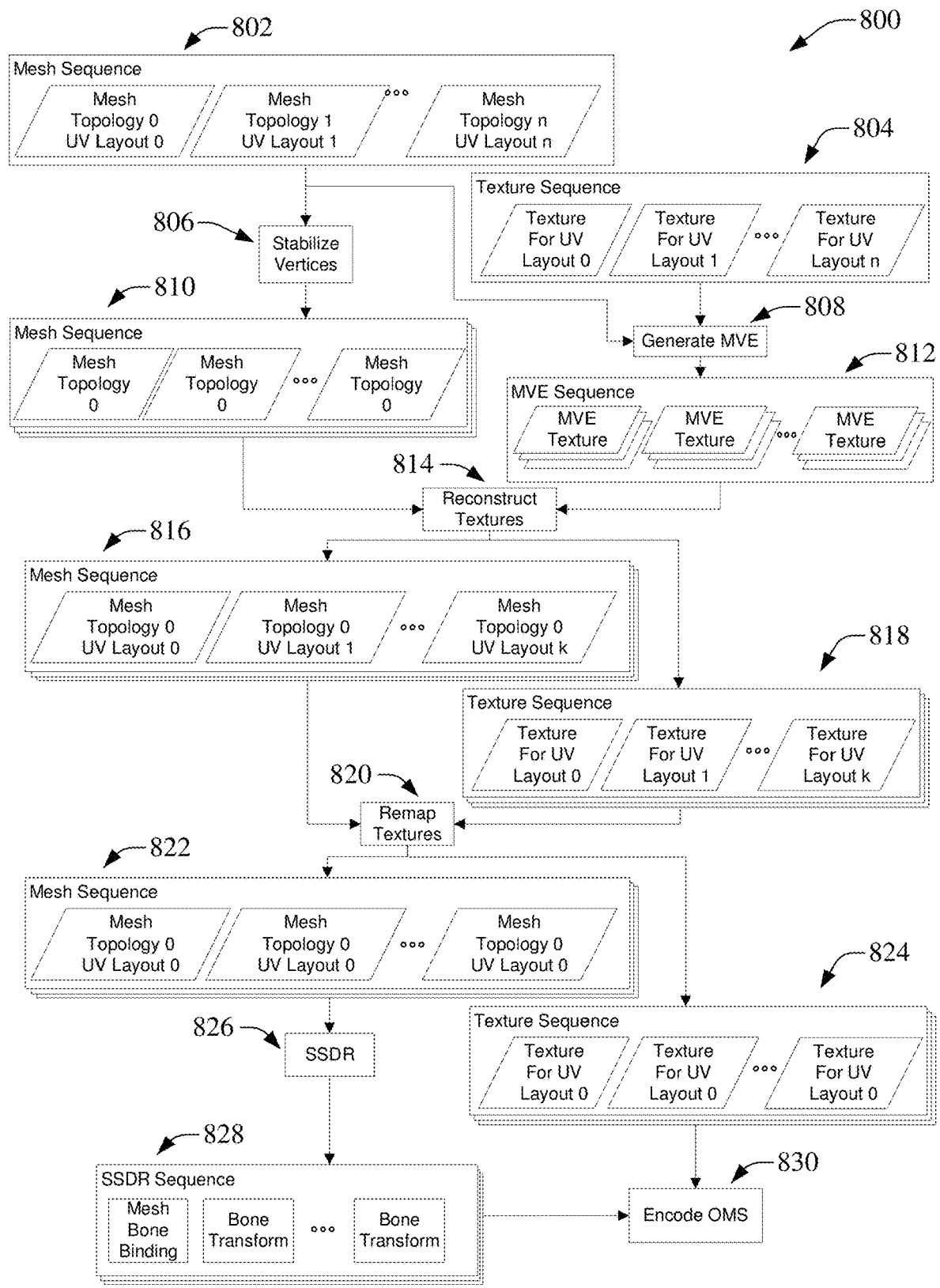
FIG. 8 is process diagram depicting an exemplary UV stabilization process in accordance with one or more example embodiments described herein.

Referring now to FIG. 8, illustrated is a process diagram depicting an exemplary UV stabilization process in accordance with one or more embodiments described herein. Vertices of a Mesh Sequence 802 can be stabilized at 806. Stabilizing the vertices at 806 can result in a Mesh Sequence 810 comprising stabilized vertices. At 808, an MVE can be generated using the Mesh Sequence 802 and a Texture Sequence 804. An MVE Sequence 812 can be generated as a result of Generate MVE 808. At 814, textures can be reconstructed utilizing Mesh Sequence 810 and MVE Sequence 812. Reconstructing textures at 814 can result in a Mesh Sequence 816 and a Texture Sequence 818. At 820, the Mesh Sequence 816 and the Texture Sequence 818 can be subjected to remapping. As a result, a Mesh Sequence 822 and Texture Sequence 824 can be generated. At 826, Mesh Sequence 822 can be subjected to SSDR, resulting in SSDR Sequence 828. Finally, an OMS-type file or other file for volumetric content or video can be encoded at 830, utilizing the SSDR Sequence 828, Texture Sequence 824, both SSDR Sequence 828 and Texture Sequence 824, or other data.

Figure 9:
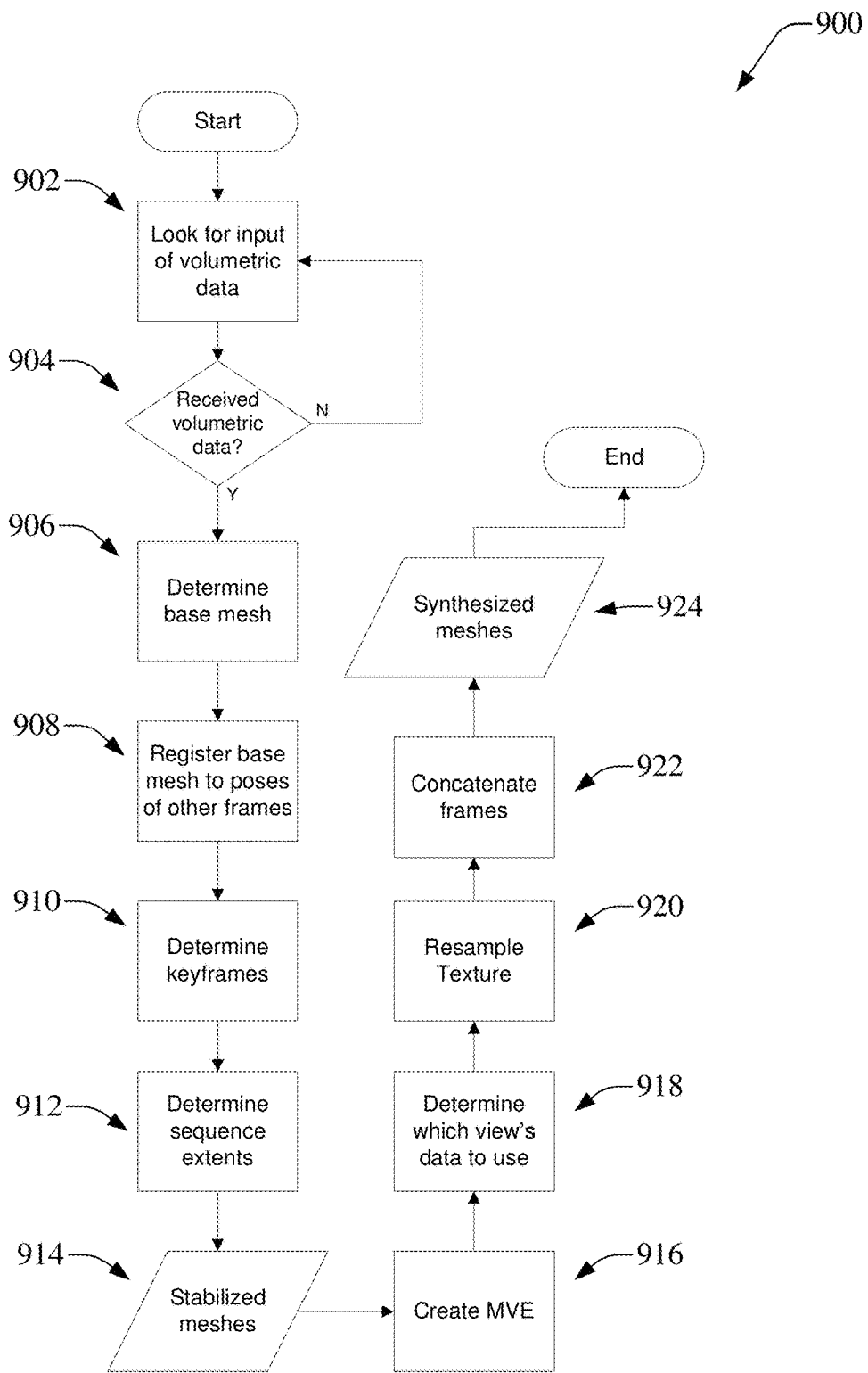
FIG. 9 is a flowchart of an example method for texture mapping of volumetric data in accordance with one or more example embodiments described herein.

Referring now to FIG. 9, a flowchart of a process 900 for UV stabilization of per-frame texture maps is shown. At 902, a volumetric data post-production and distribution system can look for an input of volumetric data. The volumetric data can comprise, for instance, a group of unstabilized meshes comprising UV maps. The volumetric data can, for example, comprise multiple views of an object. If at 904, volumetric data is determined to be not received, the system returns to 902. If at 904, volumetric data is determined to be received, then the system proceeds to 906. At 906, a base mesh is determined. According to an embodiment, a mesh of a sequence of UV mapped meshes can comprise different topologies and UV layouts. At 908, the base mesh can be non-rigidly registered to poses provided by other frames of a common sequence. According to an embodiment, a first point of a first unstabilized mesh and a second point of a second unstabilized mesh can correspond to a common location of an object appearing in the first unstabilized mesh and the second unstabilized mesh. At 910, keyframes are determined. At 912, sequence extents are determined. According to an embodiment, a dynamically selected keyframe can be used to determine sequence extents and keyframes. Stabilizing meshes can comprise associating each unstabilized mesh of a group of unstabilized meshes with a group of keyframes, wherein each keyframe of the group of keyframes is associated with at least one unstabilized mesh of the group of unstabilized meshes. At 914, meshes have reached a stabilized condition. Stabilized meshes can comprise a shared topology. An MVE can be generated at 916 using either source camera data from an original input mesh reconstruction process, or a simulated MVE can be created by rendering input meshes with original texture maps into views and storing the simulated camera parameters. The topology of a mesh can be stabilized, whereby a base mesh is non-rigidly registered to poses provided by other frames of sequence. The non-rigid registration can comprise hierarchical node sampling. At 918, it can be determined which view's data to use for a given triangle of a mesh. At 920, to make the UV coordinates consistent across frames, keyframe mesh UVs for all frame are used and the texture from non-keyframes can be resampled to a new texture that has the same UV layout as the keyframe using, for example, barycentric coordinates and filtering. At 922, the new texture maps for all subsequences are concatenated into the frames of an H.265 encoded video. The encoding can comprise encoding a mesh stream comprising surface shape information and a texture stream comprising surface albedo information. Synthesized meshes can therefore result at 924.

Figure 10:
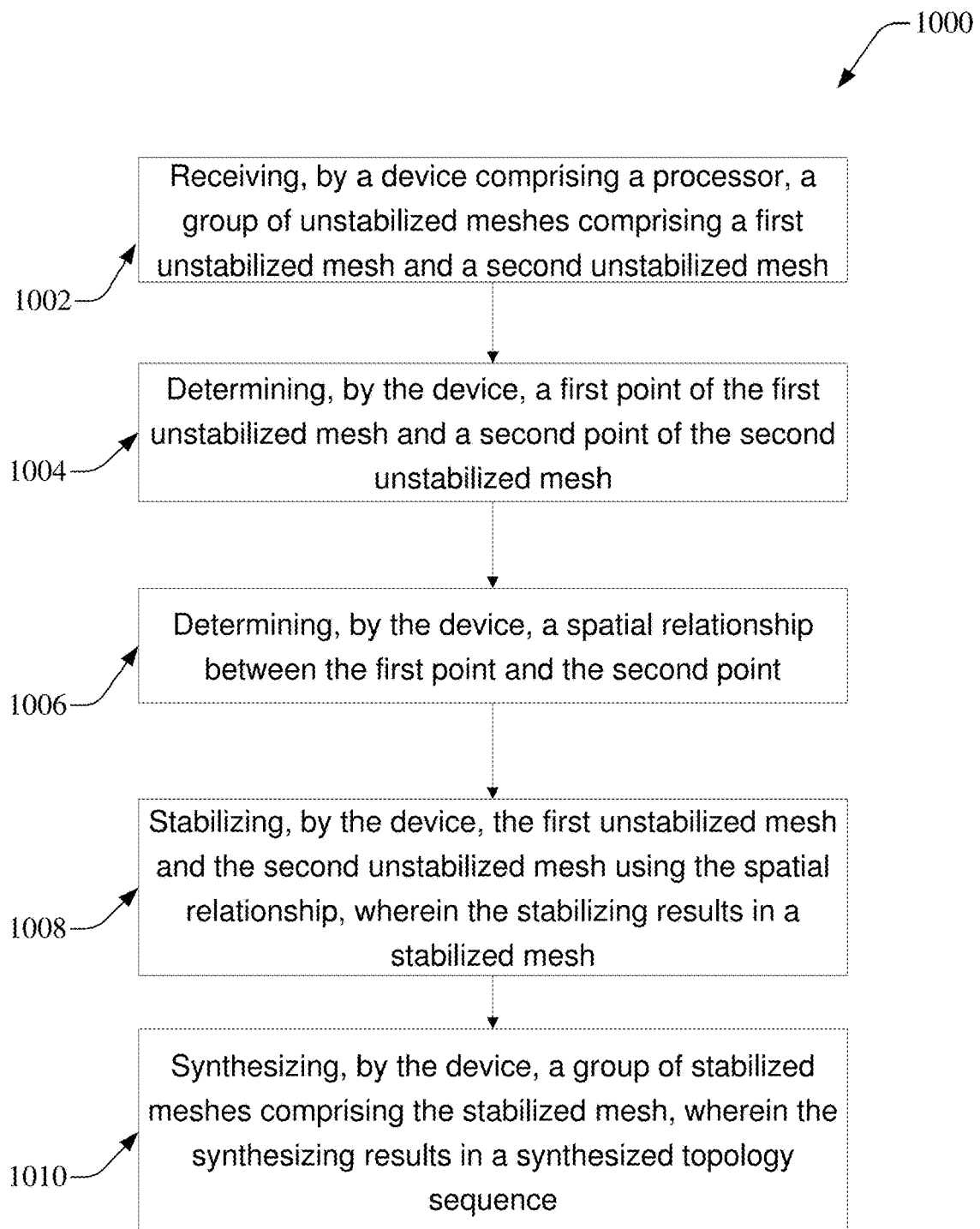
FIG. 10 is a block flow diagram for a process in which a group of unstabilized meshes is received and is ultimately synthesized in accordance with one or more example embodiments described herein.

Turning now to FIG. 10, illustrated is a flow diagram of a process 1000 for UV Stabilization of per-frame texture maps in accordance with one or more embodiments descried herein. At 1002, a group of unstabilized meshes comprising a first unstabilized mesh and a second unstabilized mesh is received by a device comprising a processor. At 1004, a first point of the first unstabilized mesh and a second point of the second unstabilized mesh are determined by the device. At 1006, a spatial relationship between the first point and the second point is determined by the device. At 1008, the first unstabilized mesh and the second unstabilized mesh are stabilized using the spatial relationship, wherein the stabilizing results in a stabilized mesh. At 1010, a group of stabilized meshes comprising the stabilized mesh are synthesized wherein the synthesizing results in a synthesized topology sequence.

Figure 11:
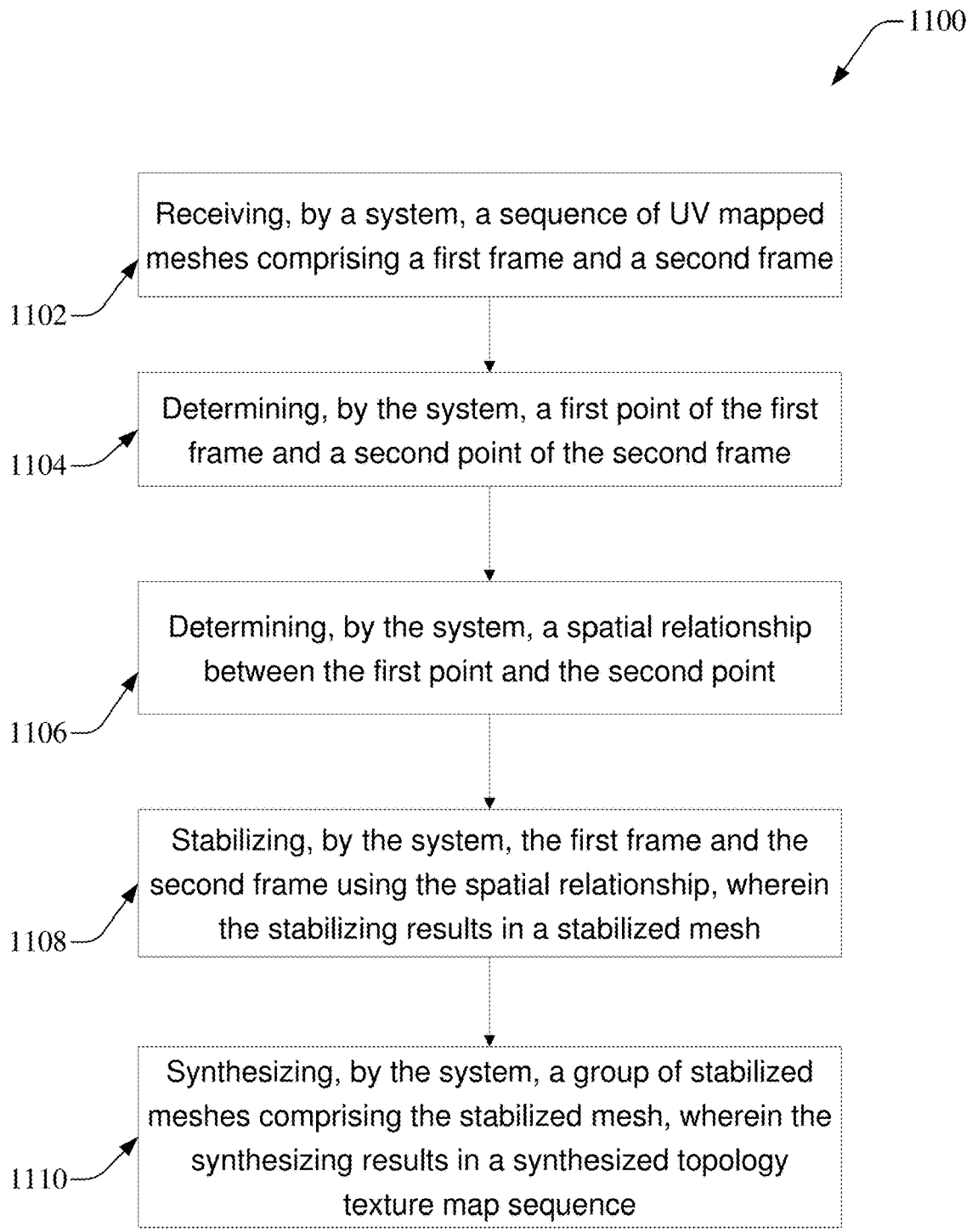
FIG. 11 is a block flow diagram for a process in which a sequence of UV mapped meshes is received and is ultimately synthesized in accordance with one or more example embodiments described herein.

Referring now to FIG. 11, illustrated is a flow diagram of a process 1100 for UV Stabilization of per-frame texture maps in accordance with one or more embodiments descried herein. At 1102, a sequence of UV mapped meshes comprising a first frame and a second frame is received by a system. At 1104, a first point of the first frame and a second point of the second frame are determined by the system. At 1106, a spatial relationship between the first point and the second point are determined by the system. At 1108, the first frame and the second frame are stabilized by the system using the spatial relationship, wherein the stabilizing results in a stabilized mesh. At 1110 a group of stabilized meshes comprising the stabilized mesh are synthesized by the system, wherein the synthesizing results in a synthesized topology texture map sequence.

Figure 12:
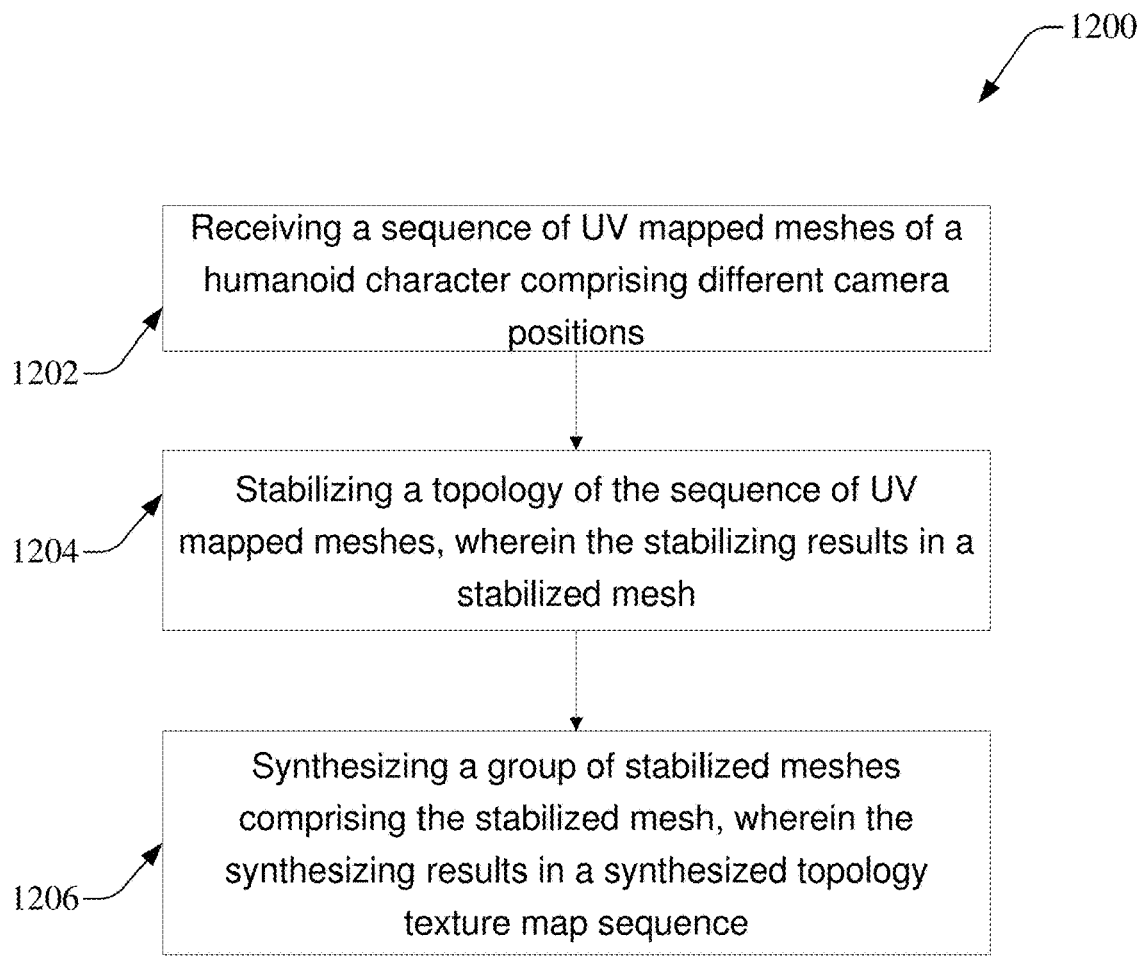
FIG. 12 is a block flow diagram for a process in which a sequence of UV mapped meshes of a humanoid character is received and is ultimately synthesized in accordance with one or more example embodiments described herein.

With reference to FIG. 12, illustrated is a flow diagram of a process 1200 for UV Stabilization of per-frame texture maps in accordance with one or more embodiments descried herein. At 1202, a sequence of UV mapped meshes of a humanoid character comprising different camera positions is received. At 1204, a topology of the sequence of UV mapped meshes is stabilized, wherein the stabilizing results in a stabilized mesh. At 1206, a group of stabilizes meshes comprising the stabilized mesh is synthesized, wherein the synthesizing results in a synthesized topology texture map sequence.

Figure 13:
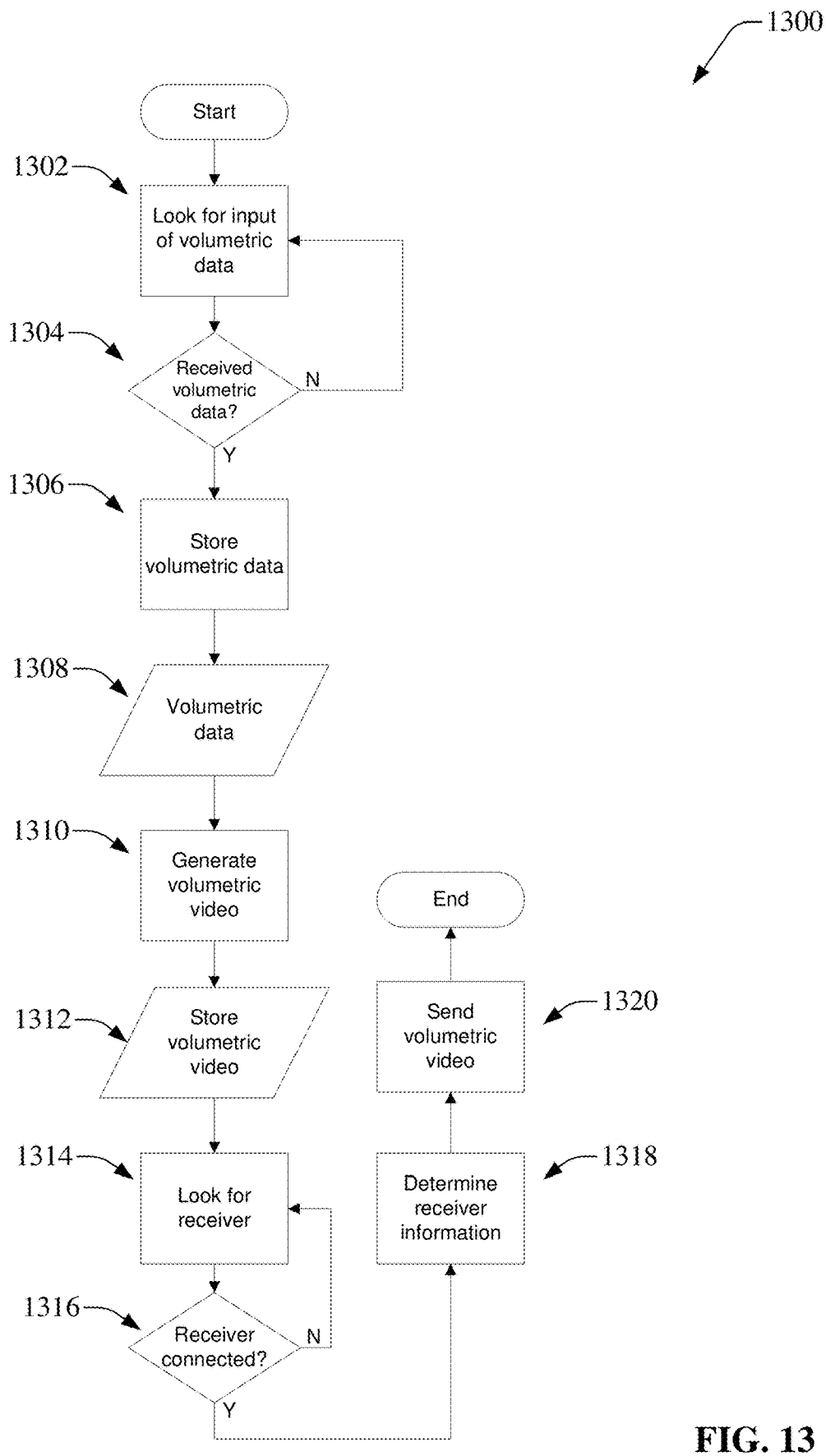
FIG. 13 is a flowchart of an example method for adaptive streaming of volumetric content in accordance with one or more example embodiments described herein.

Turning now to FIG. 13, a flowchart of a process 1300 for adaptive streaming of volumetric video content is shown. At 1302, a system waits for an input of volumetric data. At 1304, the system determines if volumetric data has been received. If volumetric data has not been received at 1304, the system returns to 1302. If at 1304 the system determines that volumetric data has been received, the system proceeds to 1306. At 1306, volumetric is stored in a data store 1308, such as a server communicatively coupled to the system. At 1310 a volumetric content (e.g. volumetric video) is generated. The volumetric video can be the same as the volumetric data, but at a different bitrate. A plurality of volumetric videos of a variety of bitrates can be generated at 1310. Generating a volumetric video at 1310 can additionally comprise segmenting the volumetric video or videos. Segmenting can result in segments of differing lengths or of common lengths. The segments can comprise common volumetric video content. Segmenting can, for instance, occur between keyframes of a volumetric video. At 1312, the volumetric video or plurality of volumetric videos are stored. Like the volumetric data, the volumetric video or videos can be stored to a server communicatively coupled to the system. At 1314, the system searches for a receiver (e.g. smartphone, tablet, computer, TV, or other device capable of receiving a volumetric video or volumetric content) is communicatively coupled to the system. If at 1316, it is determined that a receiver is not communicatively coupled to the system, the system returns to 1314. If at 1316, a received is determined to be connected, the system proceeds to 1318. At 1318, information about the receiver is determined. Such information can be a type of device, screen size, screen resolution, bandwidth between the system and the receiver, etc. A volumetric video of the volumetric videos can be determined to be the presently optimal video to send or stream. At 1320, a volumetric video corresponding to the receiver is sent or streamed to the receiver. The volumetric video can be rendered at the receiver by blending segments in the case that bitrates change during a streaming of volumetric content, thus resulting in smoother segment transition at the receiver according to a defined smoothness criterion.

Figure 14:
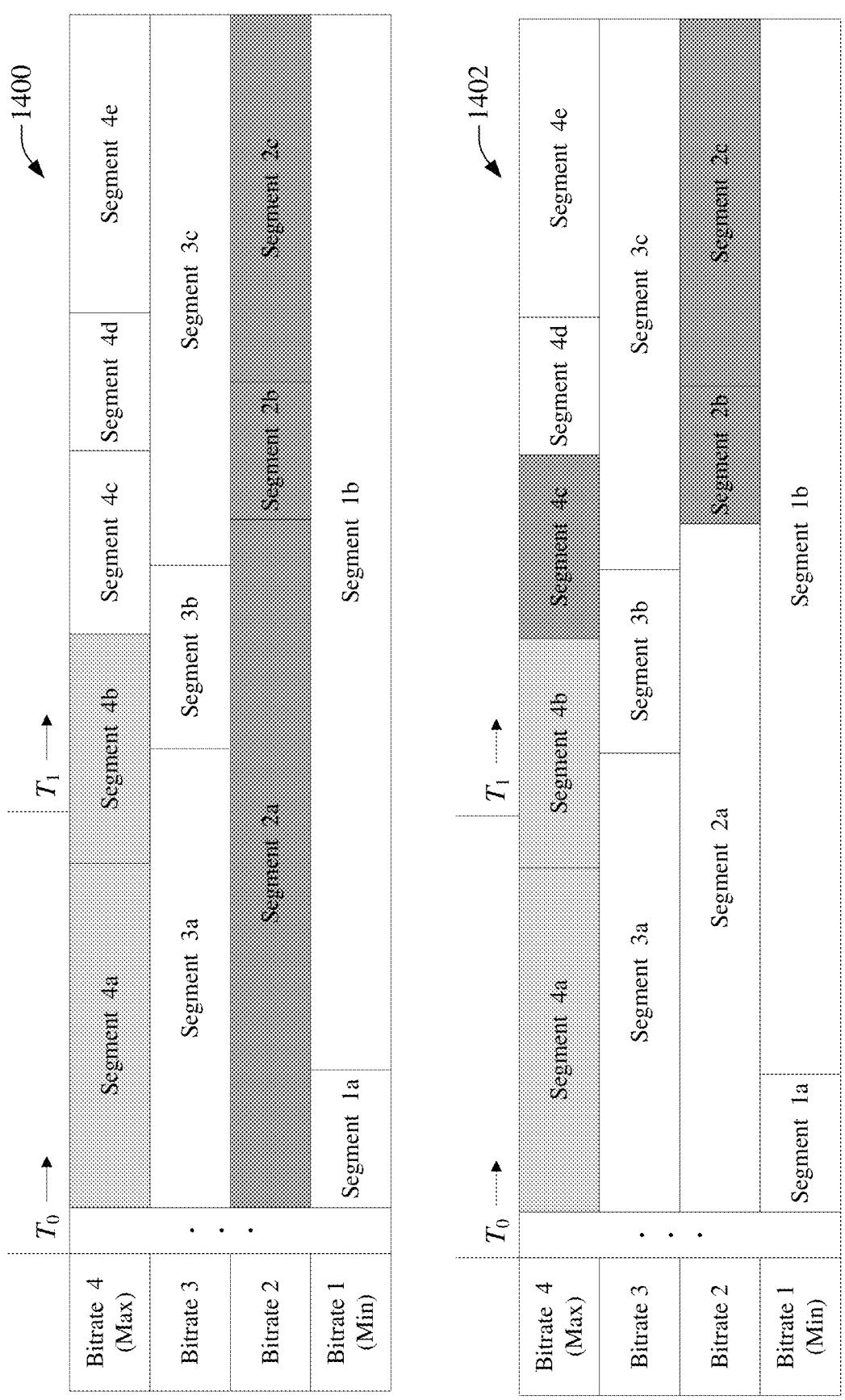
FIG. 14 is an exemplary diagram of adaptive streaming of volumetric content depicted in accordance with one or more example embodiments described herein.

Referring now to FIG. 14, there is illustrated an exemplary set of volumetric videos that can be streamed to a receiver device. Adaptively streaming volumetric data over variable wireless bandwidth is supported by multi-rate encodings of volumetric data and just in time selection and serving of data based on current bandwidth rates. To create an adaptive volumetric stream, a user can upload volumetric data to a cloud processing server which computes and stores to Content Delivery Network CDN a variety of copies of the stream at different bitrates. Each bitrate stream is a series of segments covering sequential time interval of the stream. A media presentation description can be used to describe the different streams, intervals, encodings, and other metadata of the individual stream segments. A user can connect over HTTP to the streaming service and can report bandwidth rate. A system or service can then select the correct stream and interval to send to the receiver in order to maximize available bandwidth up to a given cap provided by the client.

In FIG. 14, Bitrates 1, 2, 3, and 4 corresponding to volumetric videos 1, 2, 3, and 4 respectively for both embodiments 1400 and 1402, and can comprise common volumetric videos of different bitrates. According to an embodiment, Bitrate 4 can comprise the highest bitrate and Bitrate 1 can comprise the lowest bitrate. Segments 4a, 4b, 4c, 4d, and 4e can correspond to segments of volumetric video 4. Segments 3a, 3b, and 3c can correspond to segments of volumetric video 3. Segments 2a, 2b, and 2c can correspond to segments of volumetric video 2. Segments 1a and 1b can correspond to segments of volumetric video 1. Segments can differ in length of time or can comprise a common duration. While playing back, and changing from one bit rate to another, a calculation can compare the bandwidth cost of getting future segments at the current bitrate until the next target bitrate with the bandwidth cost of getting the previous segment of the target bitrate.

According to an example illustrated in embodiments 1400 and 1402, at time $T_1$, volumetric video is being streamed at Bitrate 4 (max bitrate). A system can detect a requirement that a lower bitrate is required, and a target bitrate can be changed to the best bitrate according to present conditions. In an exemplary scenario, Bitrate 2 can become the target bitrate.

With reference to the foregoing and according to an embodiment 1400, a segment of Bitrate 2 beginning prior to $T_1$ can be selected and streamed. In this case, Segment 2a is streamed, followed by Segment 2b and Segment 2c.

According to another embodiment 1402, the next segment of Bitrate 4 (Segment 4c) can be streamed followed by an overlapping segment of Bitrate 2 (Segment 2b). The overlap can be temporary. Segment 4c can smoothly transition to Segment 2b. At the receiver, Segment 4c is blended into Segment 2b as Segment 4c finishes playing.

Figure 15:
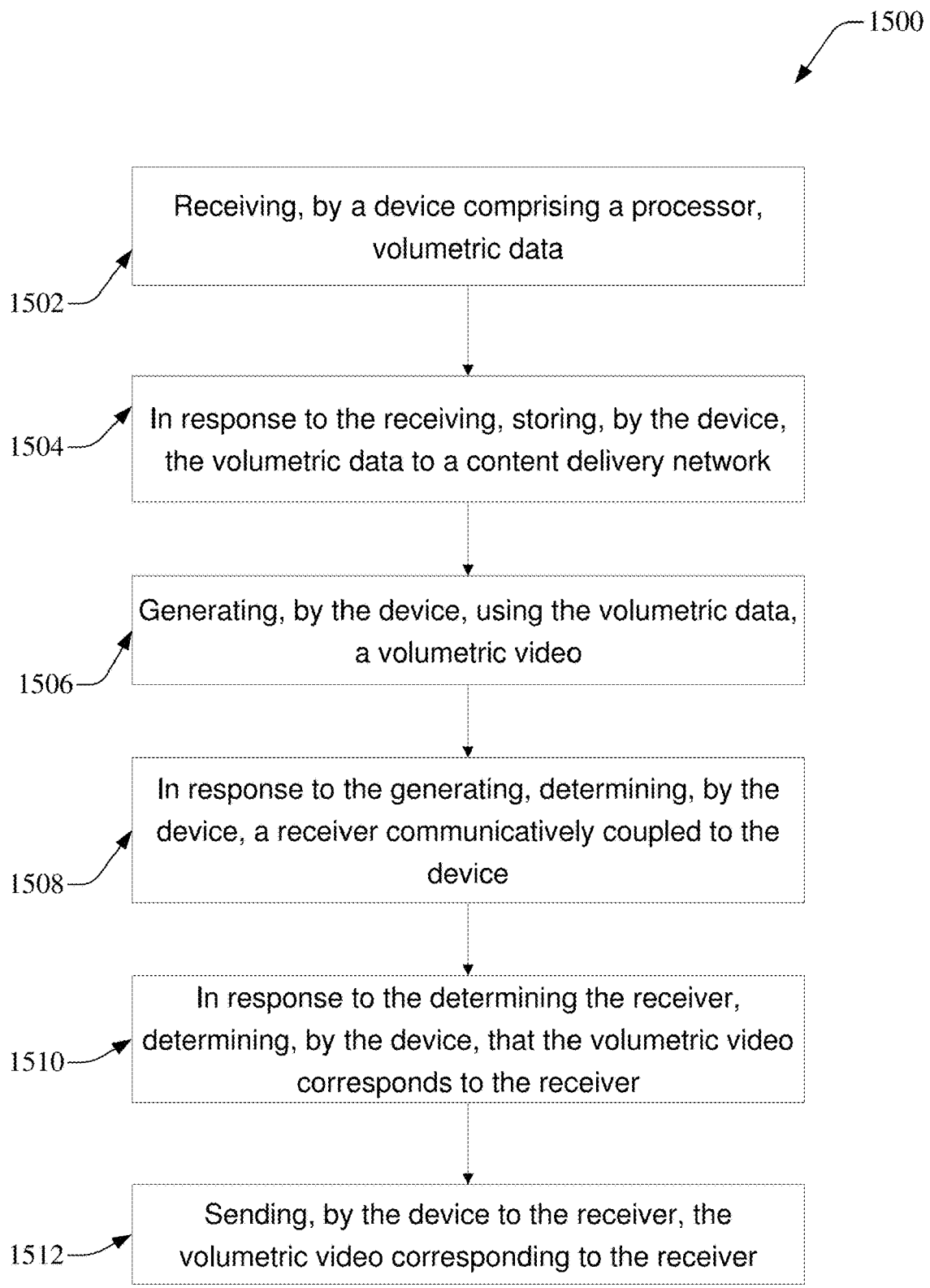
FIG. 15 is a block flow diagram for a process in which volumetric data is received and a volumetric video is ultimately sent to a device in accordance with one or more example embodiments described herein.

Turning now to FIG. 15, illustrated is a flow diagram of a process 1500 for Adaptive Streaming of Volumetric video content in accordance with one or more embodiments descried herein. At 1502, volumetric data is received by a device comprising a processor. At 1504, the volumetric data is stored to a content delivery network by the device. At 1506, a volumetric video corresponding to the volumetric data is generated. At 1508, the device can determine a receiver communicate coupled to the device. At 1510, the volumetric video corresponding to the receiver can be determined by the device. At 1512, the device can send to the receiver the volumetric video corresponding to the receiver.

Figure 16:
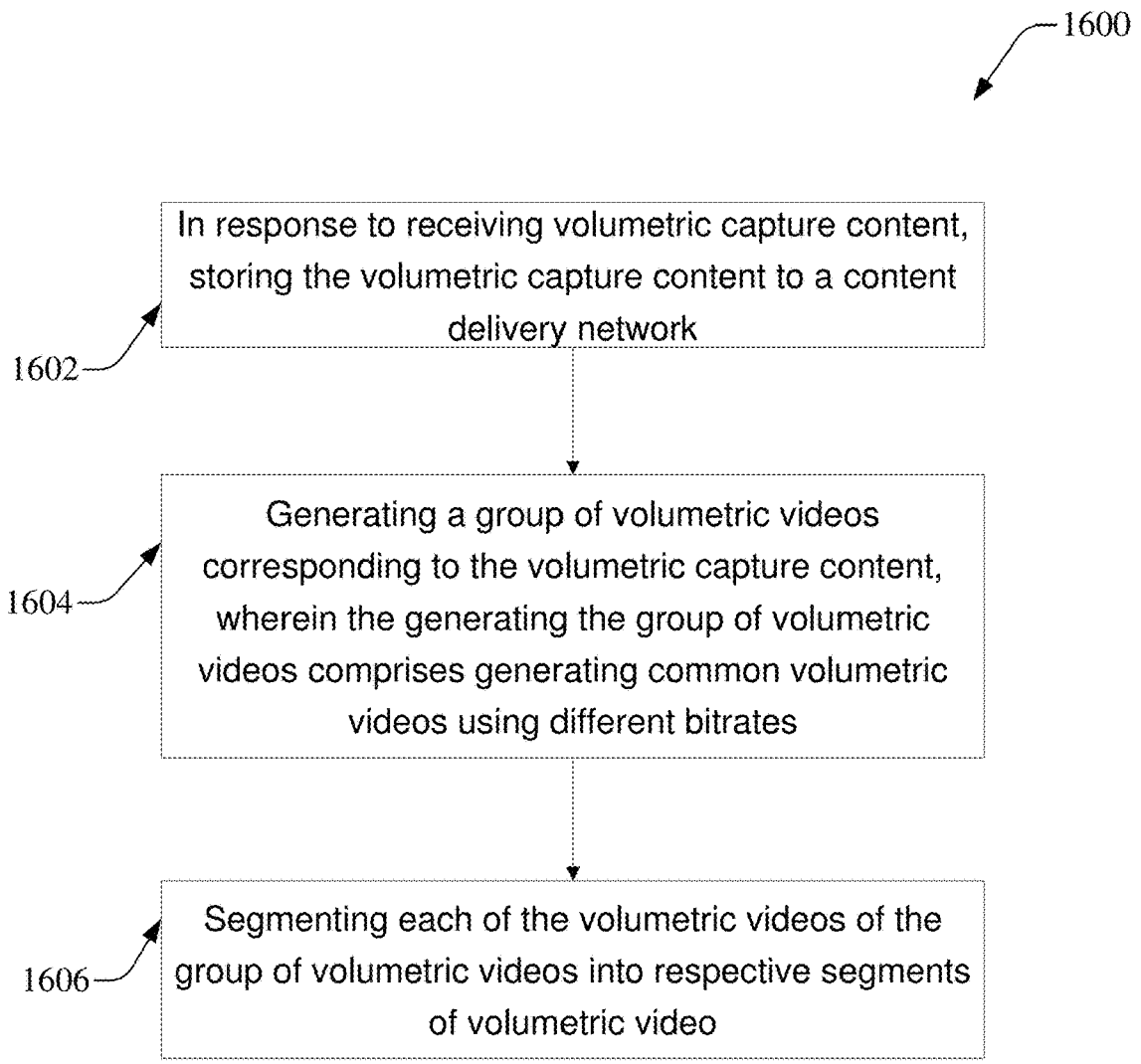
FIG. 16 is a block flow diagram for a process in which volumetric capture content is received and a volumetric video is segmented in accordance with one or more example embodiments described herein.

With reference to FIG. 16, there is illustrated a flow diagram of a process 1600 for adaptive streaming of volumetric video content in accordance with one or more embodiments described herein. At 1602, volumetric capture content is received by the system and stored to a content delivery network. At 1604, a group of volumetric videos corresponding to the volumetric capture content is generated, wherein the generating the group of volumetric videos comprises generating common volumetric videos comprising different bitrates. At 1606, each volumetric video of the group of volumetric videos is segmented by the system into respective segments of volumetric video.

Figure 17:
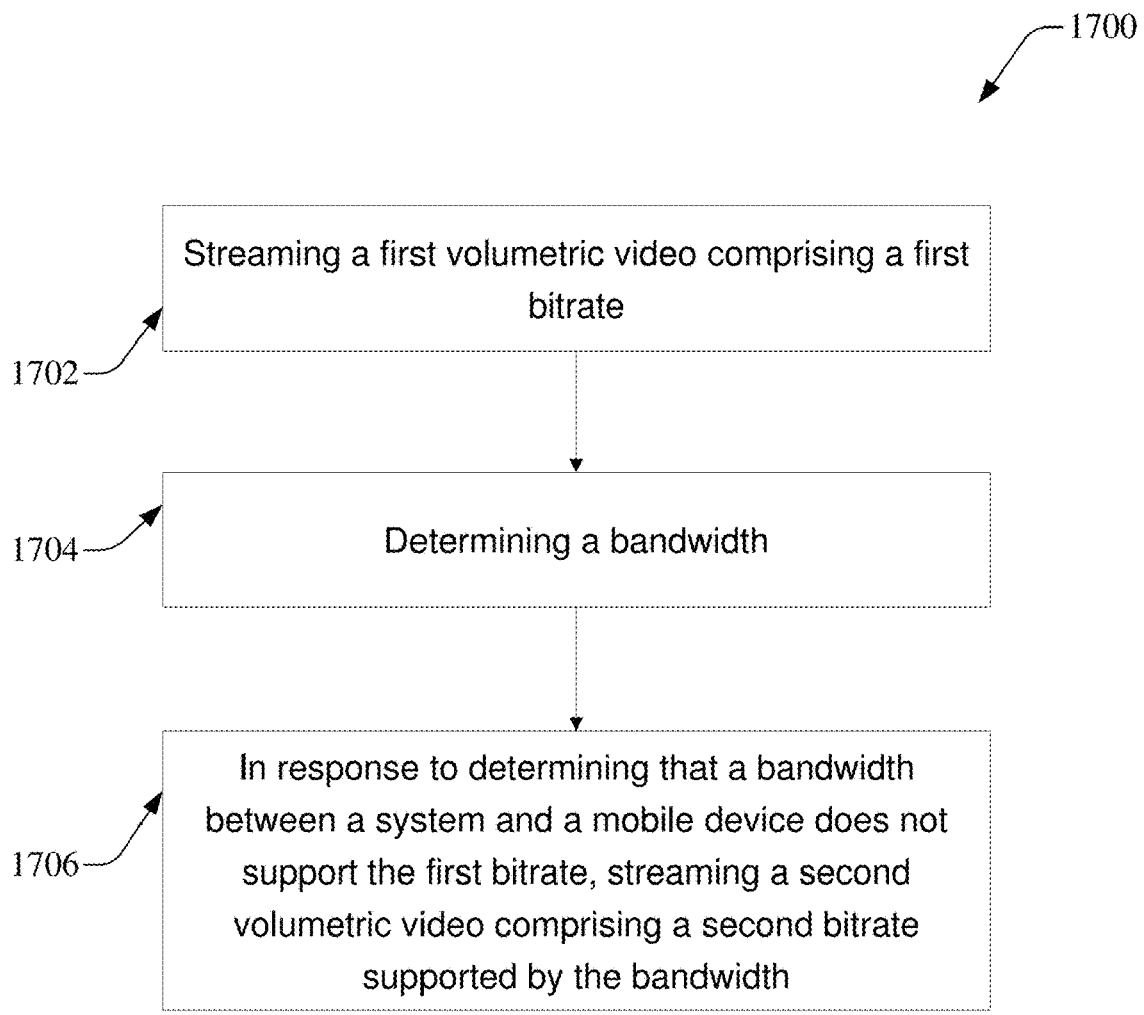
FIG. 17 is a block flow diagram for a process in which a volumetric video is streamed in accordance with one or more example embodiments described herein.

Referring now to FIG. 17, illustrated is a flow diagram of a process 1700 for adaptive streaming of volumetric video content in accordance with one or more embodiments described herein. At 1702, a first volumetric video comprising a first bitrate is streamed. At 1704, a bandwidth is determined. At 1706, in response to determining that a bandwidth between a system and a mobile device does not support the first bitrate, a second volumetric video comprising a second bitrate supported by the bandwidth is streamed.

Figure 18:
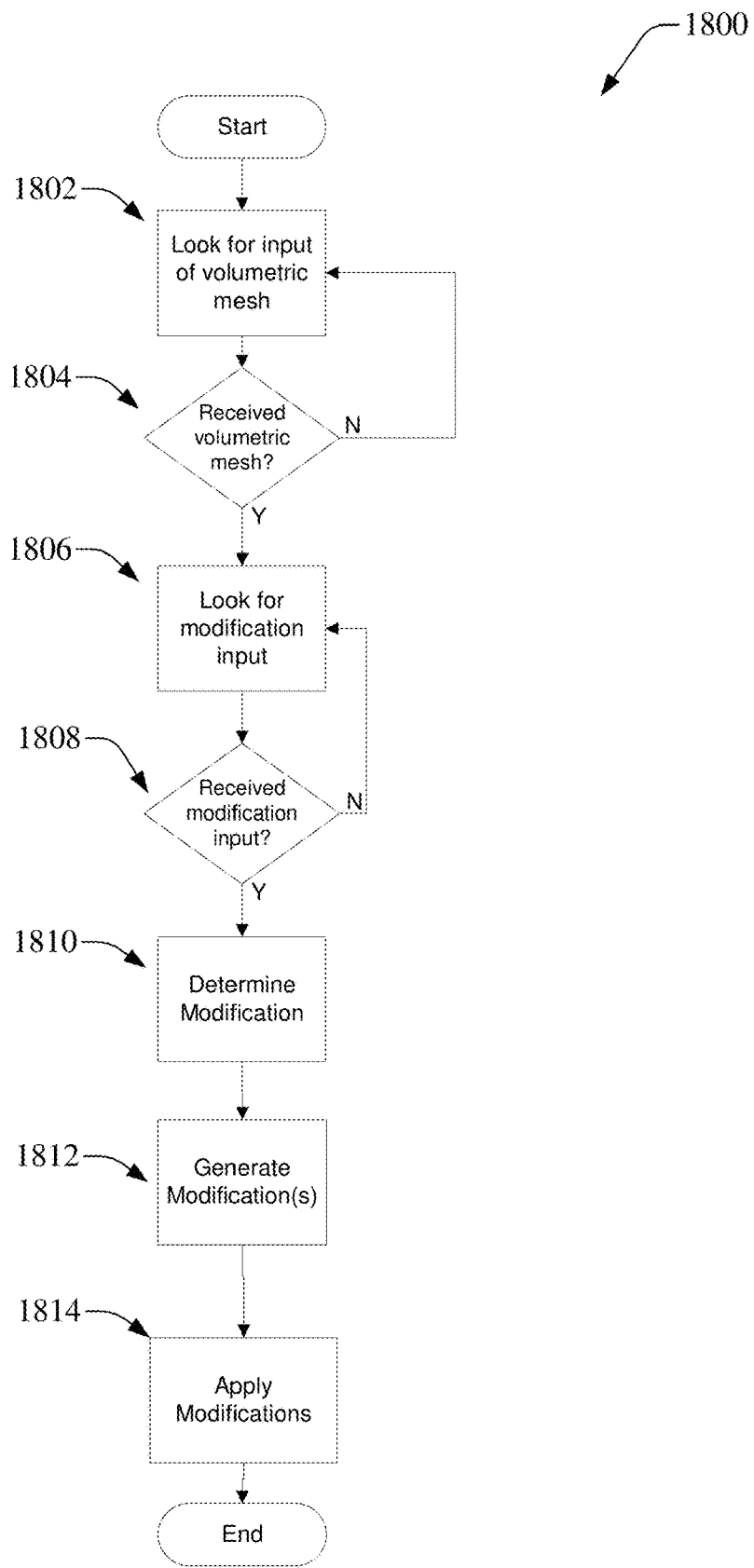
FIG. 18 is a flowchart of an example method of template matching in accordance with one or more example embodiments described herein.

With reference to FIG. 18, a flowchart of a process 1800 for template matching is shown. At 1802, a system can detect an input of a volumetric mesh. A volumetric mesh can comprise an object comprising a surface. If at 1804, the system determines that no volumetric mesh has been received, the system can return to 1802. If at 1804, the system determines that a volumetric mesh has been received, the system can proceed to 1806. At 1806, the system can detect an input of a modification. If at 1808, the system determines that no modification has been received, the system can return to 1806. If at 1808, the system determines that a modification has been received, the system can proceed to 1810. A modification can comprise, for instance, a change to a surface of an object, such as a change of shape or color of the surface. At 1810, the modification can be evaluated or determined. At 1812, modifications corresponding to the modification determined in 1810 can be generated. For instance, the modifications that correspond to the modification can comprise like-modifications to subsequent or preceding frames of volumetric content comprising the volumetric mesh (i.e. a modification can be adapted to other frames or other meshes). At 1814, the generated modifications can be applied.

As a result of the foregoing, an artist can make changes to mesh M[i] and the system can propagate those changes forward and backward through meshes M[i+1], M[i+2] . . . and M[i−1], M[i−2]. Changes can comprise change in color, shape, texture, etc. of a surface. Different poses can exist in different meshes or frames. This propagation attempts to preserve rigidity and prevent shearing, while keeping the edited mesh data as intact as possible by minimizing an energy function of a deformation of mesh M[i] into M[j]. The result saves considerable labor for artists. Non-rigid registration can be used to deform a template mesh into the pose of another mesh representing the same surface. Error in a parameter set, describing the movement of "space warping" functions on a set of hierarchical nodes that cover the vertices of the template mesh, can be minimized. The error residuals are given by a set of energy functions:

1. E[point]: Point to Point: for each point, the distance from the nearest point
2. E[plane]: Point to Plane: for each point, the distance from the nearest planar surface 3. E[rigid]: Rigidity & Shearing error: distortion of the basis vectors making up the local neighborhood of a point.
4. E[smooth]: addresses the notion that nodes should not move in ways that significantly differ from their neighboring nodes (i.e. deformations to a surface should be smooth). Non-linear least squares optimization can be used to solve for the minimum.

A per vertex weight change $[v]<=(0 \ldots 1)$ can be calculated by using the template mesh prior to changes and a weighting equation based on per-vertex Hausdorff function with a "margin" and "max" parameter such that:

$$\text{change } [v]=\text{clamp01}(\text{dist}(M[\text{template}][v],M[\text{template}][v]^*)-\text{margin})/\text{max})$$

where M[template] is the template mesh before changes, M[template]* is the mesh after an artist makes changes and v is the index of the with vertex. Change [v] can also be given by direct vertex painting by the artist where desired.

E[point] and E[plane] can be thought of as the "shrink wrapping" portion of the energy function and E[rigid] and E[Smooth] can be thought of as the structure preserving portion. Therefore, to propagate artist changes to frames M[i] we weight the energy function contributions E[point] and E[plane] by change [v]. This attempts to preserve rigidity and prevent shearing for vertices with high change [v] while moving them such that the energy function is minimized for vertices with low change [v] that neighbor. The foregoing can enable playback without an appearance of jitter during playback.

Figure 19:
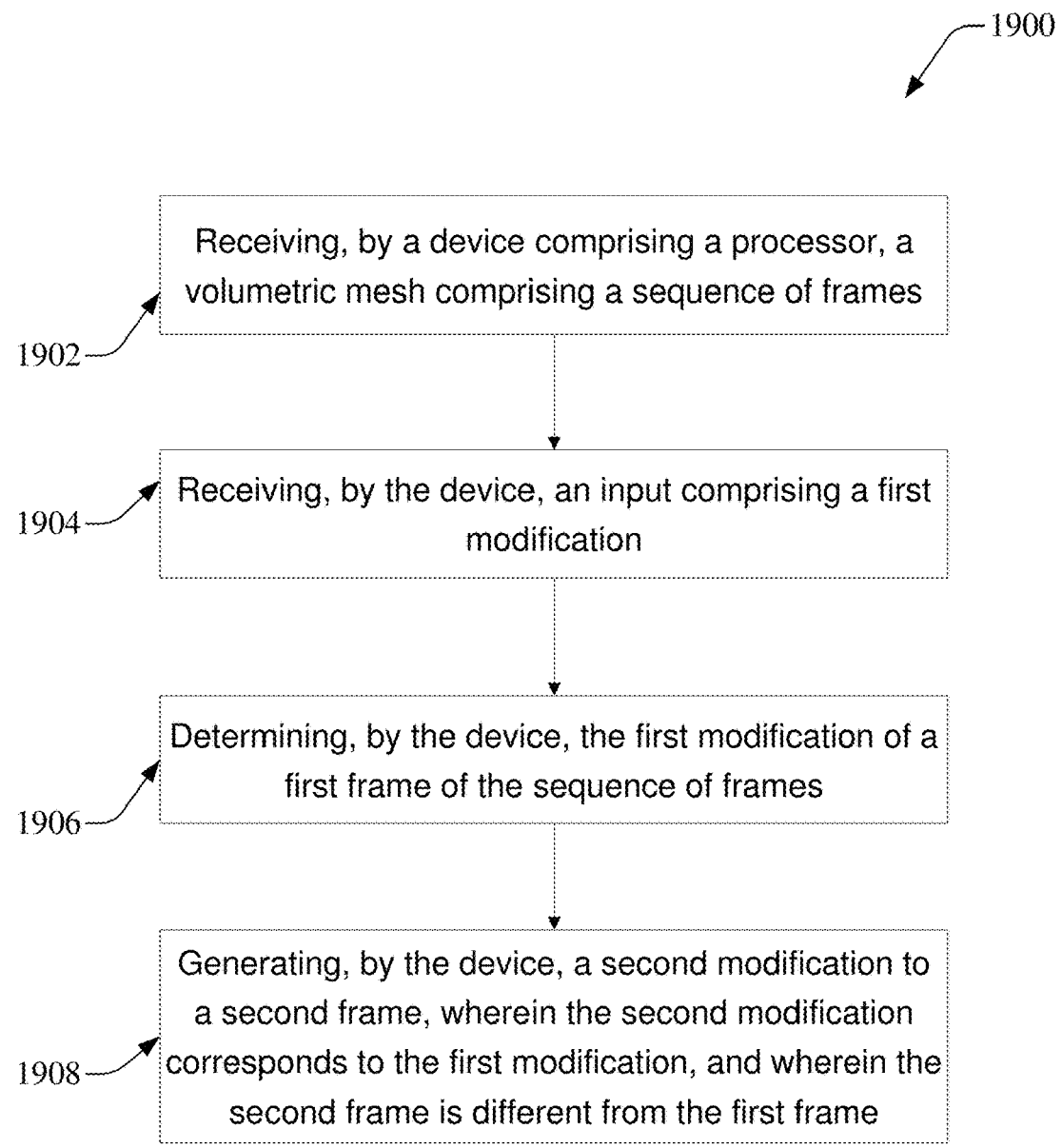
FIG. 19 is a block blow diagram for a process in which a volumetric mesh is received and a modification to a frame is ultimately generated in accordance with one or more example embodiments described herein.

Referring now to FIG. 19, illustrated is a flow diagram of a process 1900 for template matching in accordance with one or more embodiments described herein. At 1902, a device comprising a processor can receive a volumetric mesh comprising a sequence of frames. At 1904, in input comprising a first modification can be received by the device. At 1906, the first modification of a first frame of the sequence of frames can be determined by the device. At 1908, a second modification to a second frame can be generated by the device, wherein the second modification corresponds to the first modification, and wherein the second frame is different from the first frame.

Figure 20:
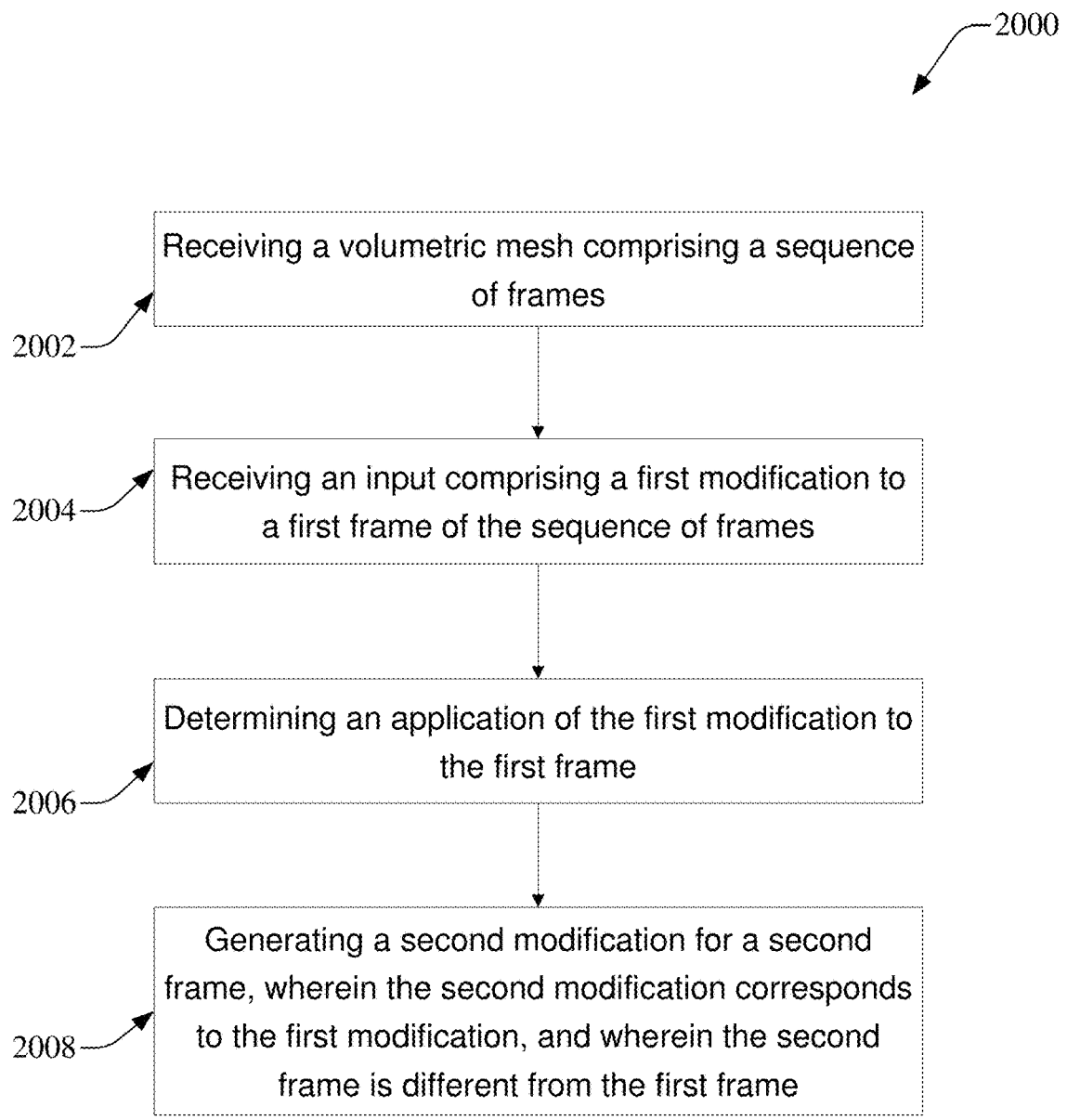
FIG. 20 is a block flow diagram for a process in which a volumetric mesh is received and a modification to a frame is ultimately generated in accordance with one or more example embodiments described herein.

With reference now to FIG. 20, there is illustrated a flow diagram of a process 2000 for template matching in accordance with one or more embodiments described herein. At 2002, a volumetric mesh comprising a sequence of frames can be received by the system. At 2004, an input comprising a first modification to a first frame of the sequence of frames can be received by the system. At 2006, an application of the first modification to the first frame can be determined by the system. At 2008, a second modification for a second frame can be generated by the system, wherein the second modification corresponds to the first modification, and wherein the second frame is different from the first frame.

Figure 21:
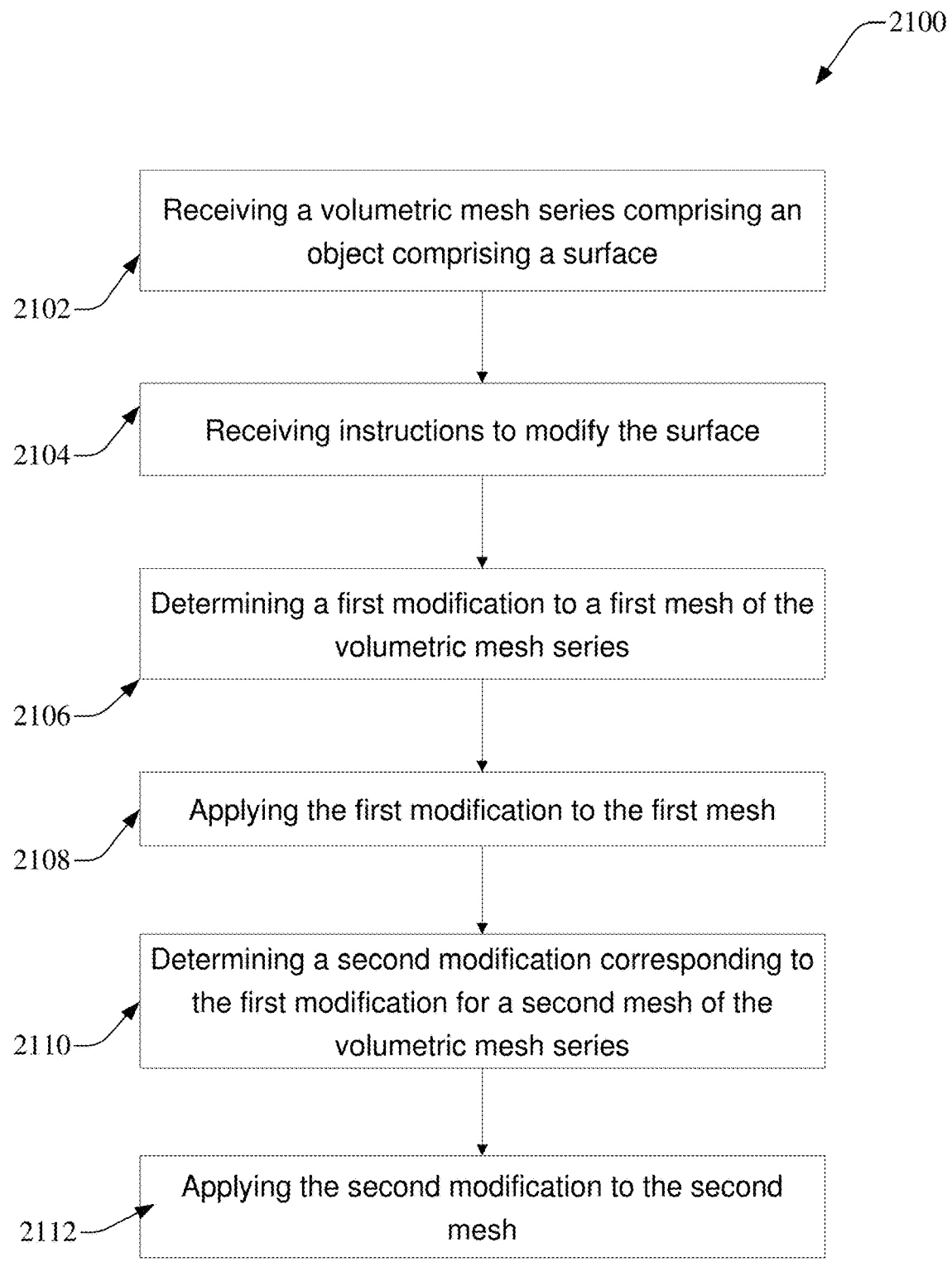
FIG. 21 is a block flow diagram for a process in which a volumetric mesh series is received and a modification is ultimately applied in accordance with one or example embodiments described herein.

Turning now to FIG. 21 there is illustrated a flow diagram of a process 2100 for template matching in accordance with one or more embodiments described herein. At 2102, a volumetric mesh series comprising an object comprising a surface can be received. At 2104, instructions to modify the surface can be received. At 2106, a first modification to a first mesh of the volumetric mesh series can be determined. At 2108, the first modification can be applied to the first mesh. At 2110, a second modification corresponding to the first modification for a second mesh of the volumetric mesh series can be determined. At 2112, the second modification can be applied to the second mesh.

FIGS. 3-13 and 15-21 as described above illustrate respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 22:
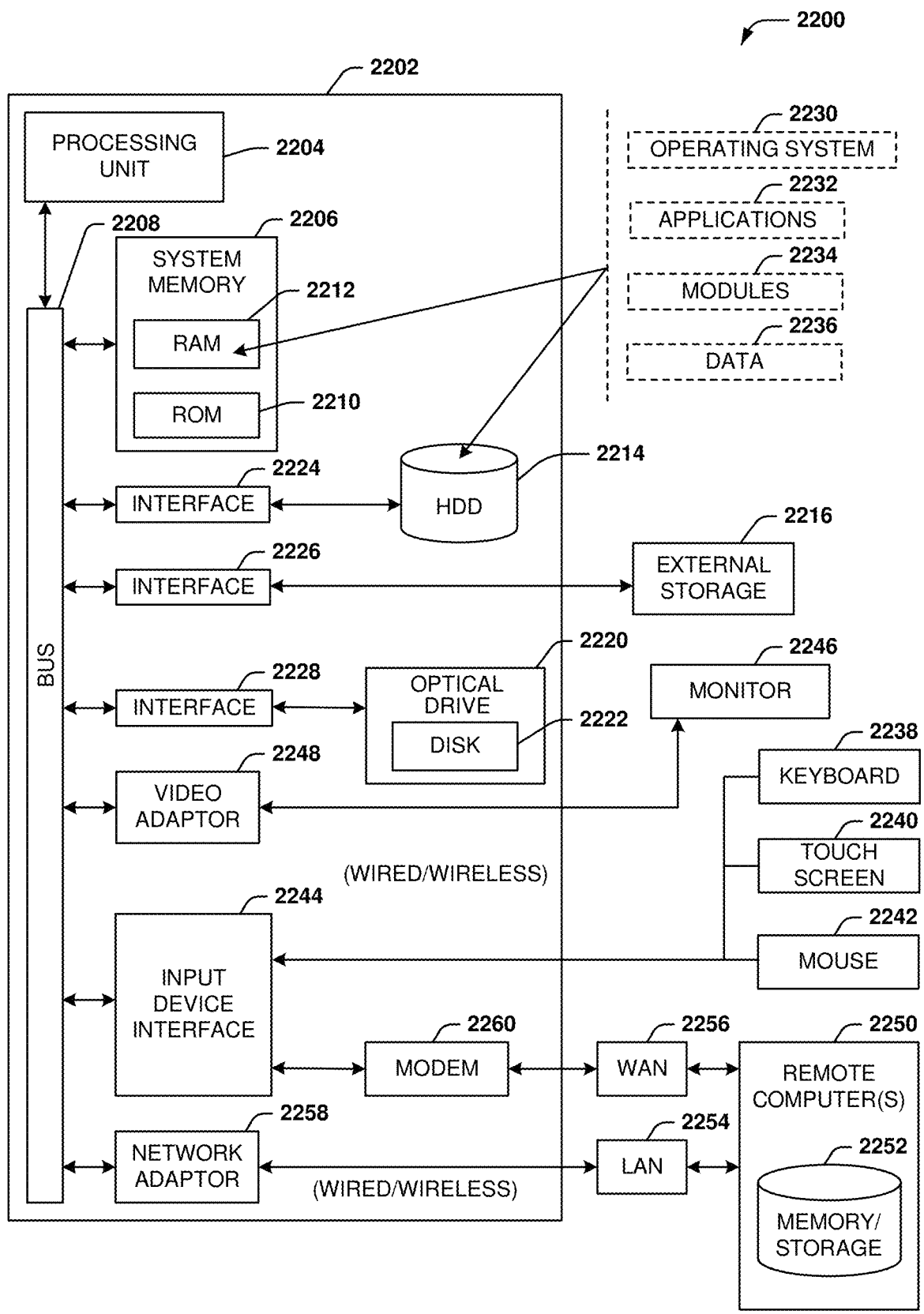
FIG. 22 is an example, non-limiting computing environment in which one or more example embodiments described herein can be implemented.

In order to provide additional context for various embodiments described herein, FIG. 22 and the following discussion are intended to provide a brief, general description of a suitable computing environment 2200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can be enable with a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the Internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 23:
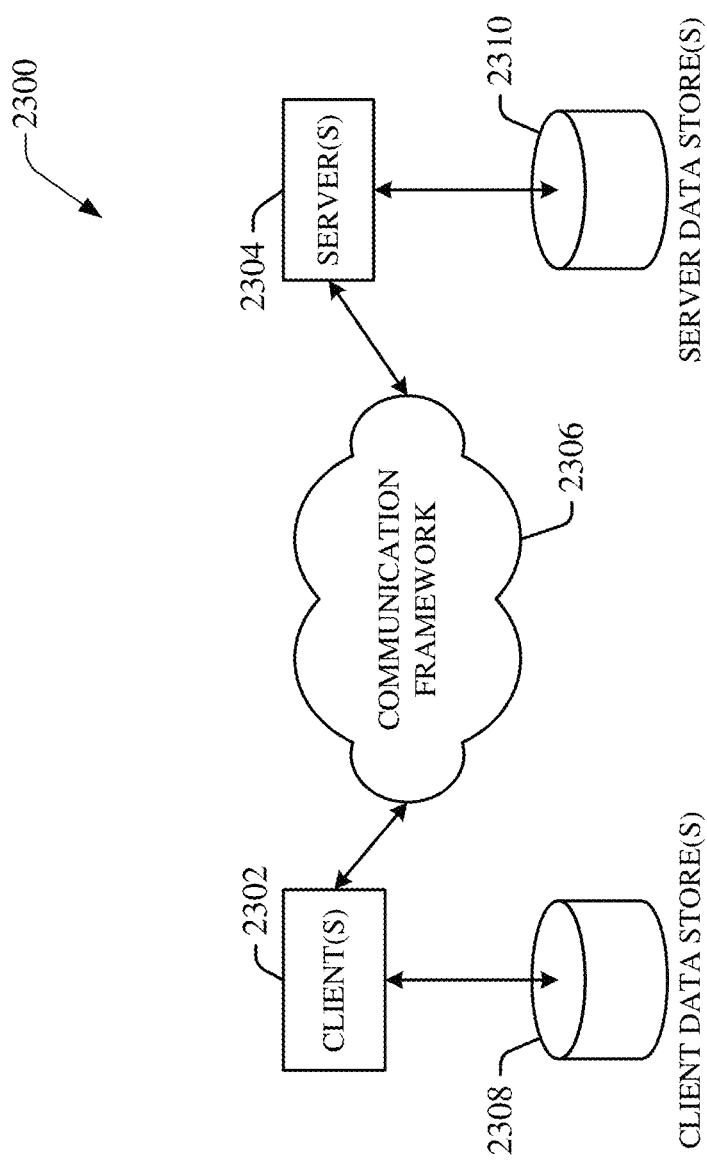
FIG. 23 is an example, non-limiting networking environment in which one or more example embodiments described herein can be implemented.

Referring now to FIG. 23, there is illustrated a schematic block diagram of a computing environment 2300 in accordance with this specification. The system 2300 includes one or more client(s) 2302, (e.g., computers, smart phones, tablets, cameras, PDA's). The client(s) 2302 can be hardware and/or software (e.g., threads, processes, computing devices). The client(s) 2302 can house cookie(s) and/or associated contextual information by employing the specification, for example.

The system 2300 also includes one or more server(s) 2304. The server(s) 2304 can also be hardware or hardware in combination with software (e.g., threads, processes, computing devices). The servers 2304 can house threads to perform transformations of media items by employing aspects of this disclosure, for example. One possible communication between a client 2302 and a server 2304 can be in the form of a data packet adapted to be transmitted between two or more computer processes wherein data packets may include coded analyzed headspaces and/or input. The data packet can include a cookie and/or associated contextual information, for example. The system 2300 includes a communication framework 2306 (e.g., a global communication network such as the Internet) that can be employed to facilitate communications between the client(s) 2302 and the server(s) 2304.

Communications can be facilitated via a wired (including optical fiber) and/or wireless technology. The client(s) 2302 are operatively connected to one or more client data store(s) 2308 that can be employed to store information local to the client(s) 2302 (e.g., cookie(s) and/or associated contextual information). Similarly, the server(s) 2304 are operatively connected to one or more server data store(s) 2310 that can be employed to store information local to the servers 2304.

In one exemplary implementation, a client 2302 can transfer an encoded file, (e.g., encoded media item), to server 2304. Server 2304 can store the file, decode the file, or transmit the file to another client 2302. It is to be appreciated, that a client 2302 can also transfer uncompressed file to a server 2304 and server 2304 can compress the file and/or transform the file in accordance with this disclosure. Likewise, server 2304 can encode information and transmit the information via communication framework 2306 to one or more clients 2302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    comparing, by a device comprising a processor, a first frame of a video to a second frame of the video, wherein the video is a first version of the video from multiple versions of the video;
    based on the comparing, determining, by the device, a set of three-dimensional points defining a position of a joint of a character represented in the video; and
    in response to receiving an edit that adjusts the position of the joint in the first version of the video, concurrently making, by the device, respective corresponding adjustments to the position of the joint in one or more second versions of the video from the multiple versions of the video different than the first version.

2. The method of claim 1, wherein the first frame is captured from a first vantage point applicable to a scene in which the character is represented, and the second frame is captured from a second vantage point applicable to the scene.

3. The method of claim 1, wherein the concurrently making the respective corresponding adjustments to the position of the joint in the one or more second versions of the video comprises varying a corresponding adjustment of the respective corresponding adjustments of the position of the joint in at least one of the one or more second versions of the video.

4. The method of claim 1, further comprising:
    in response to receiving another edit that adjusts a rotation of the joint in the first version of the video, concurrently making, by the device, respective corresponding adjustments to the rotation of the joint in the one or more second versions of the video.

5. The method of claim 4, wherein the concurrently making the respective corresponding adjustments to the rotation of the joint in the one or more second versions of the video, comprises varying a corresponding adjustment of the rotation of the joint in at least one of the one or more second versions of the video.

6. The method of claim 1, further comprising, generating, by the device, a skeletal rig comprising the joint based on the set of three-dimensional points.

7. The method of claim 1, wherein the video is a volumetric video generated from two-dimensional videos.

8. A system, comprising:
    a processor; and
    a memory communicatively coupled to the processor, the memory having stored therein computer-executable instructions, comprising:
        an edit unit that:
            compares a first frame of a video to a second frame of the video, wherein the video is a first version of the video from multiple versions of the video, and the edit unit;
            based on the comparing, determines a group of three-dimensional points defining a position of a joint of a character represented in the video;
            in response to receiving an edit that adjusts a rotation of the joint in the first version of the video, concurrently performs respective corresponding adjustments to the rotation of the joint in one or more second versions of the video from the multiple versions of the video different than the first version.

9. The system of claim 8, wherein the first frame is captured from a first perspective to a scene in which the character is represented, and the second frame is captured from a second perspective to the scene different than the first perspective.

10. The system of claim 8, wherein the edit unit, in response to receiving another edit that adjusts the position of the joint in the first version of the video, concurrently performs respective corresponding adjustments to the position of the joint in the one or more second versions of the video.

11. The system of claim 10, wherein the edit unit further varies a corresponding adjustment of the position of the joint in at least one of the one or more second versions of the video.

12. The system of claim 8, wherein the edit unit generates a skeletal rig comprising the joint based on the group of three-dimensional points.

13. The system of claim 8, wherein the video is a volumetric video generated from two-dimensional videos.

14. The system of claim 8, wherein the edit unit further varies a corresponding adjustment of the rotation of the joint in at least one of the one or more second versions of the video.

15. A non-transitory machine-readable medium, comprising executable instructions that, when executed by a processor, facilitate performance of operations, comprising:
    comparing a first frame of a video to a second frame of the video, wherein the video is a first version of the video from multiple versions of the video;
    based on the comparing, determining three-dimensional points defining a position of a joint of a character represented in the video; and
    in response to receiving an edit that adjusts the position of the joint in the first version of the video, concurrently generating respective corresponding adjustments to the position of the joint in one or more second versions of the video from the multiple versions of the video different than the first version.

16. The non-transitory machine-readable medium of claim 15, wherein the first frame is captured from a first vantage point applicable to a scene in which the character is represented, and the second frame is captured from a second vantage point applicable to the scene.

17. The non-transitory machine-readable medium of claim 15, wherein the concurrently generating the respective corresponding adjustments to the position of the joint in the one or more second versions of the video, comprises varying a corresponding adjustment of the position of the joint in at least one of the one or more second versions of the video.

18. The non-transitory machine-readable medium of claim 15, wherein the operations further comprise:
    in response to receiving another edit that adjusts a rotation of the joint in the first version of the video, concurrently generating respective corresponding adjustments to the rotation of the joint in second versions of the video from the multiple versions of the video different than the first version.

19. The non-transitory machine-readable medium of claim 18, wherein the concurrently generating the respective corresponding adjustments to the rotation of the joint in the second versions of the video, comprises varying a corresponding adjustment of the rotation of the joint in at least one of the second versions of the video.

20. The non-transitory machine-readable medium of claim 15, wherein the operations further comprise generating a skeletal rig comprising the joint based on the three-dimensional points.

\* \* \* \* \*